(12) United States Patent
Wales et al.

(10) Patent No.: US 11,091,901 B2
(45) Date of Patent: Aug. 17, 2021

(54) FAUCET HANDLE WITH ANGLED INTERFACE

(71) Applicant: Delta Faucet Company, Indianapolis, IN (US)

(72) Inventors: Joshua Wales, Indianapolis, IN (US); Kyle R. Davidson, Noblesville, IN (US); Kurt J. Thomas, Indianapolis, IN (US); Derek A. Brown, Lizton, IN (US); Ryan J. Shaw, Carmel, IN (US)

(73) Assignee: Delta Faucet Company, Indianapolis, IN (US)

( * ) Notice: Subject to any disclaimer, the term of this patent is extended or adjusted under 35 U.S.C. 154(b) by 0 days.

(21) Appl. No.: 16/587,623

(22) Filed: Sep. 30, 2019

(65) Prior Publication Data

US 2020/0024837 A1    Jan. 23, 2020

Related U.S. Application Data

(60) Continuation-in-part of application No. 15/387,247, filed on Dec. 21, 2016, now Pat. No. 10,428,497, which is a division of application No. 14/446,778, filed on Jul. 30, 2014, now Pat. No. 9,567,734, which is a division of application No. 13/182,430, filed on Jul. 13, 2011, now Pat. No. 8,820,705.

(51) Int. Cl.
*E03C 1/05* (2006.01)
*F16K 31/60* (2006.01)
*G05D 23/13* (2006.01)
*F16K 31/02* (2006.01)

(52) U.S. Cl.
CPC .............. *E03C 1/055* (2013.01); *F16K 31/02* (2013.01); *F16K 31/60* (2013.01); *G05D 23/1306* (2013.01); *Y10T 137/9464* (2015.04)

(58) Field of Classification Search
CPC ........ E03C 1/055; E03C 1/0412; F16K 31/60; F16K 31/02; G05D 23/1306; G05D 23/1393; Y10T 137/9464
See application file for complete search history.

(56) References Cited

U.S. PATENT DOCUMENTS

| 2,551,442 A | 5/1951 | Kuhlman |
| 3,056,418 A | 10/1962 | Adams et al. |

(Continued)

FOREIGN PATENT DOCUMENTS

| CA | 2725975 | 6/2001 |
| CA | 2571605 | 7/2007 |

(Continued)

OTHER PUBLICATIONS

Brizo, "Trevi Lever Faucets for Your Bath," at least as early as Apr. 30, 2011, 2 pgs., retrieved from http:--www.brizo.com-bath-collection-trevi-lever.html.

(Continued)

*Primary Examiner* — Eric Keasel
(74) *Attorney, Agent, or Firm* — Bose McKinney & Evans LLP

(57) ABSTRACT

A faucet assembly including a handle that rotates about a rotational axis extending perpendicular to an angled interface for adjusting a first water parameter. A dial is supported for rotation independent of the handle for adjusting a second water parameter.

17 Claims, 19 Drawing Sheets

(56) References Cited

U.S. PATENT DOCUMENTS

| | | |
|---|---|---|
| 3,333,160 A | 7/1967 | Gorski |
| 3,726,318 A | 4/1973 | Hyde |
| 4,200,123 A | 4/1980 | Brandelli |
| 4,417,312 A | 11/1983 | Cronin et al. |
| 4,535,814 A * | 8/1985 | Pawelzik ............ F16K 11/0782 137/625.17 |
| 4,635,673 A | 1/1987 | Gerdes |
| 4,681,141 A | 7/1987 | Wang |
| 4,709,728 A | 12/1987 | Ying-Chung |
| 4,727,906 A | 3/1988 | Holzer |
| 4,823,414 A | 4/1989 | Piersimoni et al. |
| 4,826,129 A | 5/1989 | Fong et al. |
| 4,869,287 A | 9/1989 | Pepper et al. |
| 4,932,433 A | 6/1990 | Knapp |
| 4,948,090 A | 8/1990 | Chen |
| 4,949,753 A | 8/1990 | Stewart |
| 5,025,516 A | 6/1991 | Wilson |
| 5,074,520 A | 12/1991 | Lee et al. |
| 5,224,509 A | 7/1993 | Tanaka et al. |
| 5,243,717 A | 9/1993 | Yasuo |
| 5,293,901 A | 3/1994 | Guzzini |
| 5,547,020 A | 8/1996 | Sable et al. |
| 5,549,273 A | 8/1996 | Aharon |
| 5,566,702 A | 10/1996 | Philipp |
| 5,570,869 A | 11/1996 | Diaz et al. |
| 5,592,971 A | 1/1997 | Knapp |
| 5,758,688 A | 6/1998 | Hamanaka et al. |
| 5,781,942 A | 7/1998 | Allen et al. |
| 5,810,050 A | 9/1998 | Pickerrell et al. |
| 5,893,387 A | 4/1999 | Paterson et al. |
| 5,918,855 A | 7/1999 | Hamanaka et al. |
| 5,966,753 A | 10/1999 | Gauthier et al. |
| 5,979,500 A | 11/1999 | Jahrling et al. |
| 6,003,170 A | 12/1999 | Humpert et al. |
| 6,058,967 A | 5/2000 | Welker et al. |
| 6,119,948 A | 9/2000 | Spiegel et al. |
| 6,127,671 A | 10/2000 | Parsons et al. |
| 6,135,146 A | 10/2000 | Koganezawa et al. |
| 6,161,814 A | 12/2000 | Jahrling |
| 6,192,530 B1 | 2/2001 | Dai |
| 6,199,586 B1 | 3/2001 | Pawelzik et al. |
| 6,202,980 B1 | 3/2001 | Vincent et al. |
| 6,220,266 B1 | 4/2001 | Hennessy |
| 6,244,296 B1 | 6/2001 | Lafler et al. |
| 6,257,505 B1 | 7/2001 | Wang |
| 6,273,394 B1 | 8/2001 | Vincent et al. |
| 6,340,032 B1 | 1/2002 | Zosimadis |
| 6,341,389 B2 | 1/2002 | Philipps-Liebich et al. |
| 6,363,549 B2 | 4/2002 | Humpert et al. |
| 6,393,634 B1 | 5/2002 | Kodaira et al. |
| 6,394,133 B1 | 5/2002 | Knapp |
| RE37,888 E | 10/2002 | Cretu-Petra |
| 6,484,751 B2 | 11/2002 | Lafler et al. |
| 6,513,787 B1 | 2/2003 | Jeromson et al. |
| 6,639,209 B1 | 10/2003 | Patterson et al. |
| 6,691,340 B2 | 2/2004 | Honda et al. |
| 6,768,103 B2 | 7/2004 | Watson |
| 6,770,869 B2 | 8/2004 | Patterson et al. |
| 6,877,172 B2 * | 4/2005 | Malek ................... E03C 1/0404 239/587.1 |
| 6,956,498 B1 | 10/2005 | Gauthier et al. |
| 6,959,837 B2 | 11/2005 | Shermer et al. |
| 6,962,168 B2 | 11/2005 | McDaniel et al. |
| 6,964,404 B2 | 11/2005 | Patterson et al. |
| 6,968,860 B1 | 11/2005 | Haenlein et al. |
| 6,985,239 B2 | 1/2006 | Doucet et al. |
| 6,996,863 B2 | 2/2006 | Kaneko |
| 7,150,293 B2 | 12/2006 | Jonte |
| 7,232,111 B2 | 6/2007 | McDaniel et al. |
| 7,472,433 B2 | 1/2009 | Rodenbeck et al. |
| 7,537,023 B2 | 5/2009 | Marty et al. |
| 7,631,372 B2 | 12/2009 | Marty et al. |
| 7,646,029 B2 | 1/2010 | Mueller et al. |
| 7,690,395 B2 | 4/2010 | Jonte et al. |
| 7,802,733 B2 | 9/2010 | Schmitt |
| 7,997,301 B2 | 8/2011 | Marty et al. |
| 8,534,568 B2 | 9/2013 | Gautschi |
| 8,567,430 B2 | 10/2013 | Allen et al. |
| 8,820,705 B2 | 9/2014 | Davidson |
| 9,567,734 B2 | 2/2017 | Davidson |
| 2001/0011390 A1 | 8/2001 | Humpert et al. |
| 2004/0084609 A1 | 5/2004 | Bailey |
| 2004/0104340 A1 | 6/2004 | Watson |
| 2004/0187954 A1 | 9/2004 | Shermer et al. |
| 2005/0127313 A1 | 6/2005 | Watson |
| 2005/0150556 A1 | 7/2005 | Jonte |
| 2005/0150557 A1 | 7/2005 | McDaniel et al. |
| 2005/0151101 A1 | 7/2005 | McDaniel et al. |
| 2006/0130908 A1 | 6/2006 | Marty et al. |
| 2007/0152074 A1 * | 7/2007 | Stowe ................ G05D 23/1393 236/12.1 |
| 2007/0157978 A1 | 7/2007 | Jonte et al. |
| 2008/0164331 A1 | 7/2008 | Schmitt |
| 2008/0271238 A1 | 11/2008 | Reeder et al. |
| 2010/0012194 A1 | 1/2010 | Jonte et al. |
| 2011/0100478 A1 | 5/2011 | Allen et al. |
| 2011/0147490 A1 | 6/2011 | Chen |
| 2011/0155932 A1 | 6/2011 | Jonte et al. |

FOREIGN PATENT DOCUMENTS

| | | |
|---|---|---|
| CA | 2784591 | 7/2011 |
| CN | 2793470 | 7/2006 |
| CN | 101223321 | 7/2008 |
| CN | 201407379 | 2/2010 |
| EP | 0 409 998 | 11/1995 |
| EP | 1 132 530 | 9/2001 |
| EP | 0 685 604 | 3/2003 |
| GB | 2 264 557 | 9/1993 |
| GB | 2397519 | 7/2004 |
| WO | WO 8706861 | 11/1987 |
| WO | WO 97/47828 | 12/1997 |
| WO | WO 99/61938 | 12/1999 |
| WO | WO 01/20204 | 3/2001 |
| WO | WO 2010028566 | 3/2010 |

OTHER PUBLICATIONS

Ginger Co., "Columnar™ Installation Instructions, Lavatory Set Model G45-101," Apr. 5, 2008, 4 pgs.

Ginger Co., W-S Faucet Set drawings, Assy. No. G45-101, May 30, 2008, 3 pgs.

U.S. Patent and Trademark Office, Search Report and Written Opinion, in corresponding application PCT/US2012/027117, dated May 30, 2012, 8 pages.

* cited by examiner

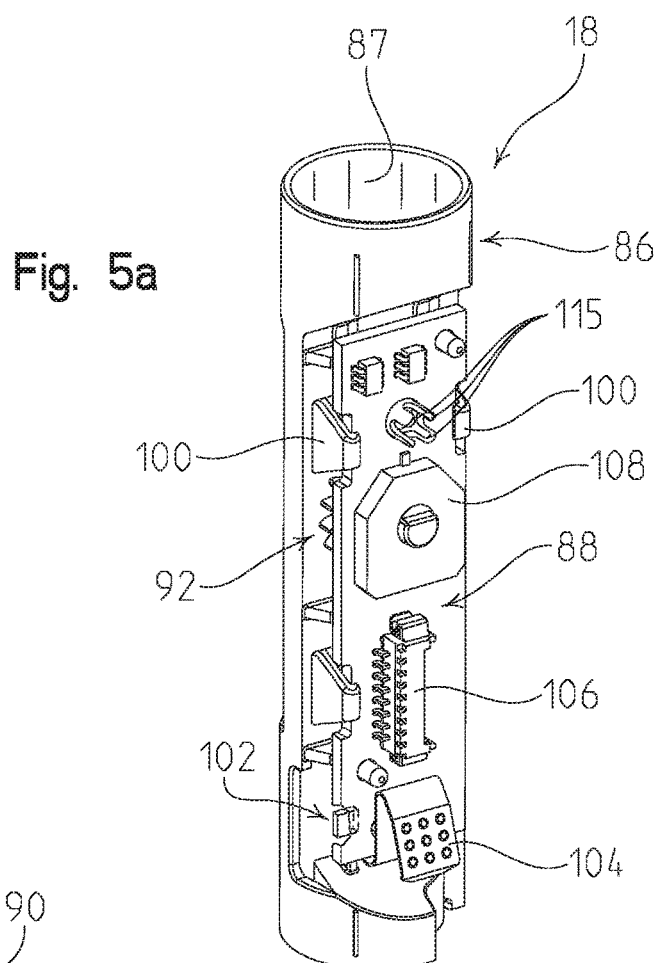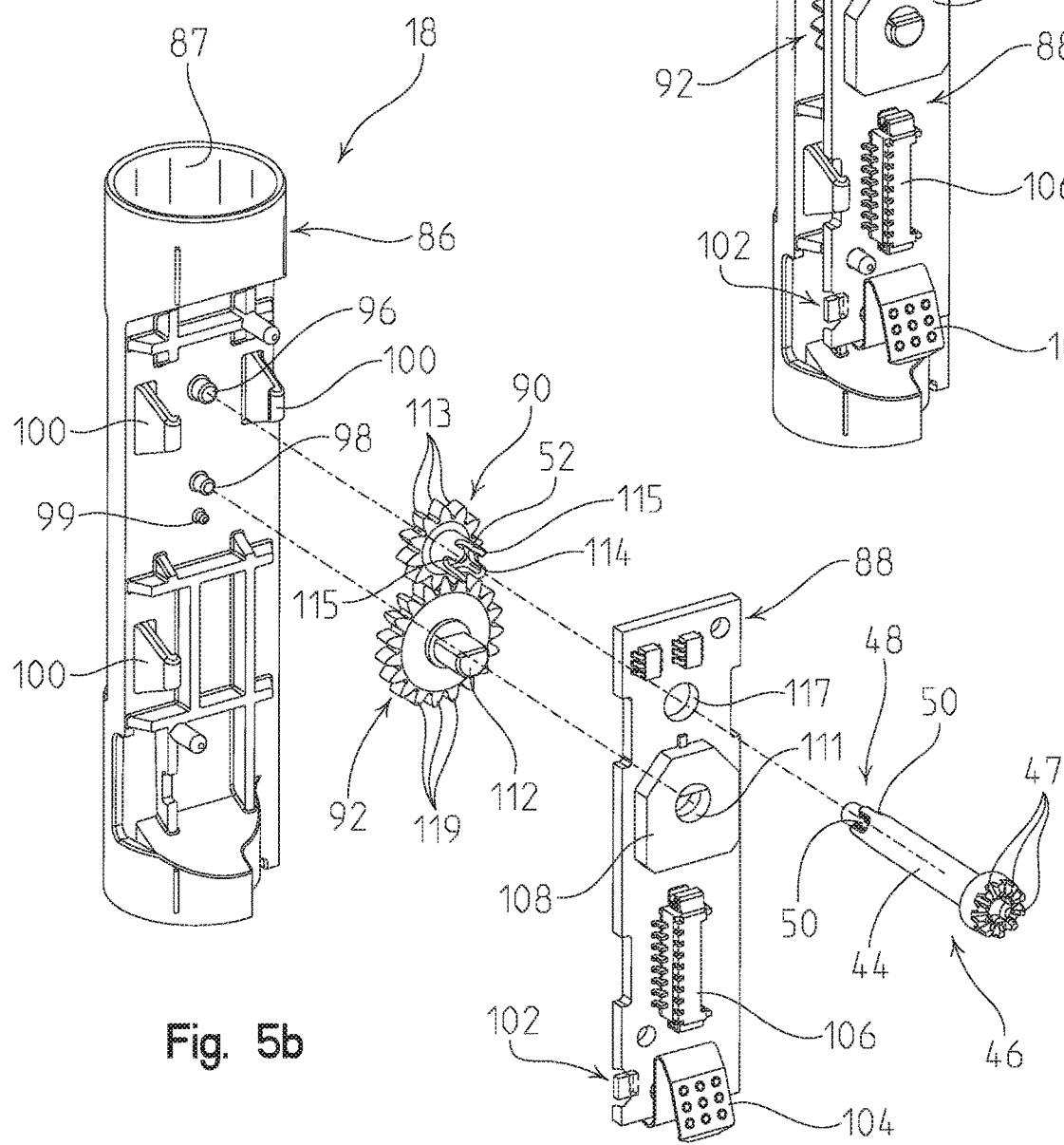

FAUCET HANDLE WITH ANGLED INTERFACE

CROSS-REFERENCE TO RELATED APPLICATIONS

The present application is a continuation-in-part of U.S. patent application Ser. No. 15/387,247, filed Dec. 21, 2016, which is a divisional of U.S. patent application Ser. No. 14/446,778, filed Jul. 30, 2014, now U.S. Pat. No. 9,567,734, which is a divisional of U.S. patent application Ser. No. 13/182,430, filed Jul. 13, 2011, now U.S. Pat. No. 8,820,705, the disclosures of which are expressly incorporated herein by reference.

BACKGROUND AND SUMMARY OF THE INVENTION

The present disclosure relates generally to faucets. More particularly, the present disclosure relates to faucets having a handle that rotates about an angled interface to adjust a water parameter.

Conventional faucets have traditionally included handles or levers to transfer mechanical motion to a mixing valve or to on/off valves for controlling water activation, flow rate, and/or temperature. Such mechanical coupling has limited the types of motion available for such faucet handles or levers. Additionally, conventional faucets including a single handle or lever traditionally control only one water parameter (e.g., water temperature or flow rate).

According to one aspect of the present disclosure, a faucet assembly includes a faucet body having a liquid pathway therein. A selector attachment base includes a longitudinal base axis and defines a selector movement plane. A selector is coupled to the selector attachment base, the selector having a longitudinal selector axis and supported for movement between a plurality of configurations to control a parameter of liquid through the liquid pathway of the faucet body. Movement of the selector between the plurality of configurations is achieved via rotation about a rotational axis that is perpendicular to the selector movement plane. The longitudinal selector axis is oriented at a first angle relative to the rotational axis, and the longitudinal selector axis is oriented at a second angle relative to the longitudinal base axis. The first angle is substantially constant and the second angle varies as the selector moves between the plurality of configurations.

According to another aspect of the present disclosure, a faucet assembly includes a spout assembly having a hub defining a vertical axis, a liquid pathway extending within the hub, and a handle attachment base extending perpendicular to the hub and defining a horizontal axis, the handle attachment base including an end having a first mounting surface. The faucet assembly further includes a temperature control handle operably coupled to the handle attachment base for rotation from a first position defining a first temperature setting and a second position defining a second temperature setting, the temperature control handle including an end having a second mounting surface. The first mounting surface and the second mounting surface define a handle movement plane angularly oriented intermediate the vertical axis of the hub of the spout assembly and the horizontal axis of the handle attachment base of the spout assembly.

According to another aspect of the present disclosure, a faucet assembly is provided including a spout assembly including a handle attachment portion having a longitudinal axis, the spout assembly having handle coupled to the handle attachment portion, the handle having a longitudinal axis, the handle having a first position in which the longitudinal axis of the handle attachment portion is perpendicular to the longitudinal axis of the handle, the handle having a second position in which the longitudinal axis of the handle attachment portion is co-linear with the longitudinal axis of the handle.

According to another aspect of the present disclosure, a faucet includes a handle attachment base having a longitudinal base axis, and a handle coupled to the handle attachment base. The handle has a longitudinal handle axis and is supported for rotation about a rotational axis. The rotational axis is angularly offset from the longitudinal base axis and the longitudinal handle axis, such that the angular position of the longitudinal handle axis relative to the longitudinal base axis varies as the handle is rotated about the rotational axis.

According to another illustrative embodiment of the present disclosure, a faucet includes a handle attachment base, and a handle coupled to the handle attachment base and supported for rotation about a rotational axis to control a first water parameter. A dial is supported for rotation relative to the handle to control a second water parameter.

According to a further illustrative embodiment of the present disclosure, a faucet includes a spout assembly including a hub defining a vertical axis, and a liquid pathway extending within the hub. A handle attachment base extends perpendicular to the hub and defines a horizontal axis, the handle attachment base including an end having a first mounting surface. A control handle is coupled to the handle attachment base for rotation from a first position defining a first setting of a first water parameter and second position defining a second setting of the first water parameter, the control handle including an end having a second mounting surface. A control dial is coupled to the control handle for rotation from a first position defining a first setting of a second water parameter and a second position defining a second setting of the second water parameter.

Additional features of the present disclosure will become apparent to those skilled in the art upon consideration of the following detailed description of the presently perceived best mode of carrying out the disclosure.

BRIEF DESCRIPTION OF THE DRAWINGS

The detailed description of the drawings particularly refers to the accompanying figures in which:

FIG. 3a is a detailed perspective view showing the relative positions of the handle axis, the base axis, and the rotational axis, with the handle in the first position of FIG. 1a;

FIG. 5a is a perspective view of an illustrative temperature circuit assembly;

FIG. 5b is an exploded perspective view of the temperature circuit assembly of FIG. 5a;

FIG. 11 is an exploded perspective view of the rotatable dial of the control handle of FIG. 10a;

FIG. 12 is a block diagram showing connections between components of the illustrative faucet of FIG. 10a;

FIG. 13 is a partial cross-sectional view taken along line 13-13 of FIG. 10a;

DETAILED DESCRIPTION OF THE DRAWINGS

Figure 1A:
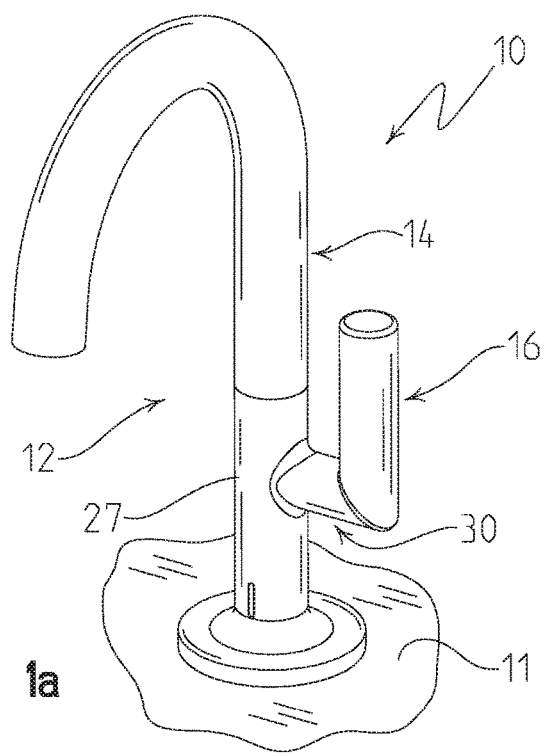
FIG. 1a is a perspective view of an illustrative faucet of the present disclosure, showing a control handle in a first or off position.
Figure 1B:
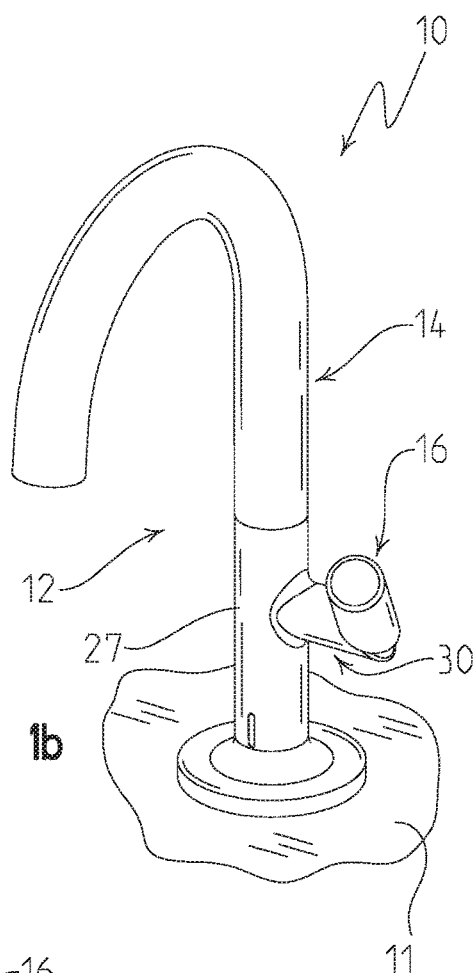
FIG. 1b is a perspective view similar to FIG. 1a, showing the control handle in a second or intermediate temperature position.
Figure 1C:
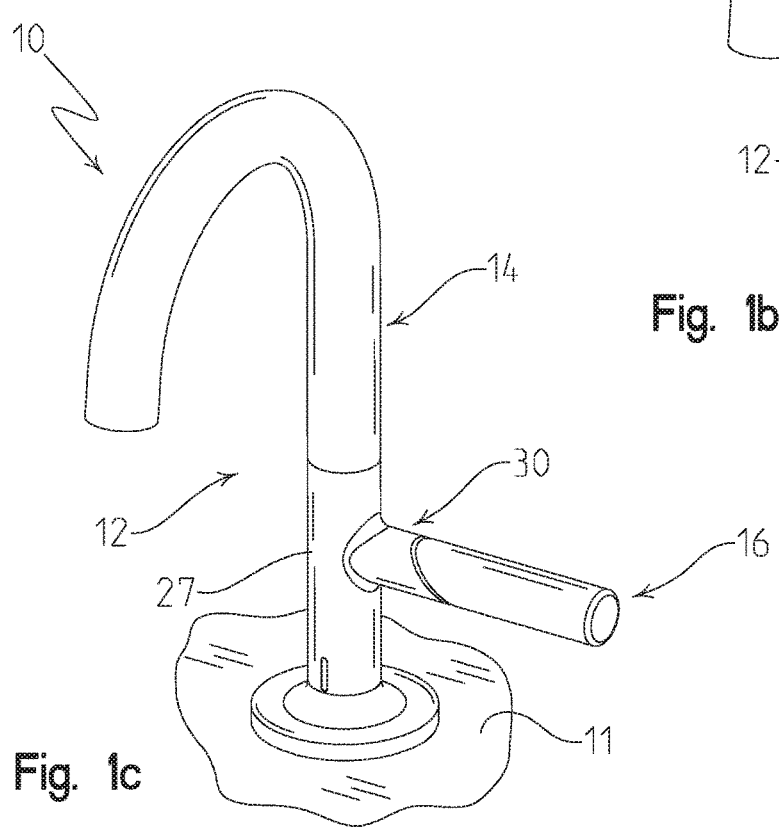
FIG. 1c is a perspective view similar to FIG. 1b, showing the control handle in a third or hot temperature position.

FIGS. 1a-1c show a spout assembly 12 of an electronic faucet 10 of the present disclosure. In certain illustrative embodiments, the electronic faucet 10 comprises a touch faucet. In the following description, the term "touch faucet" is meant to indicate that flow through the faucet 10 is activated by a user touching an outer surface of the faucet 10. The user's touch may be detected by a capacitive sensor. In other illustrative embodiments, the electronic faucet 10 may be activated by other user interfaces, for example, through infrared (IR) sensors or a manual handle. In addition to spout assembly 12, faucet 10 includes other pieces, both seen and unseen by a user and both above and below a mounting surface 11, such as a sink deck.

Figure 2:
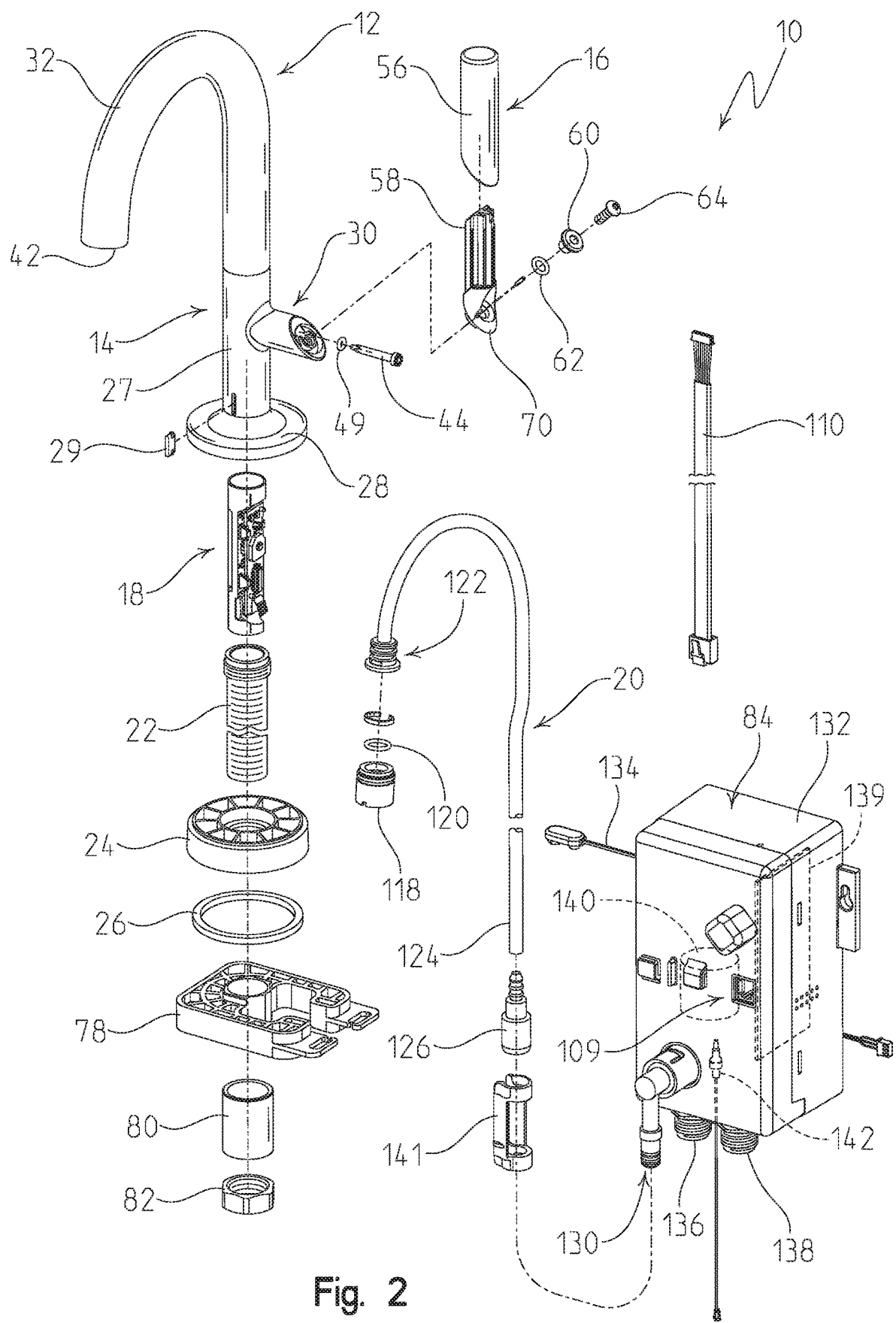
FIG. 2 is an exploded perspective view of the faucet of FIG. 1.

FIG. 2 shows an illustrative electronic faucet 10 and its components. Spout assembly 12 illustratively includes faucet body or delivery spout 14, selector or handle 16, water parameter control circuit assembly 18, water conduit 20, mounting shank 22, base spacer 24, and gasket 26. Faucet 10 further illustratively includes mounting bracket 78, spacer 80, nut 82, and electronic flow controller 84.

Figure 3A:
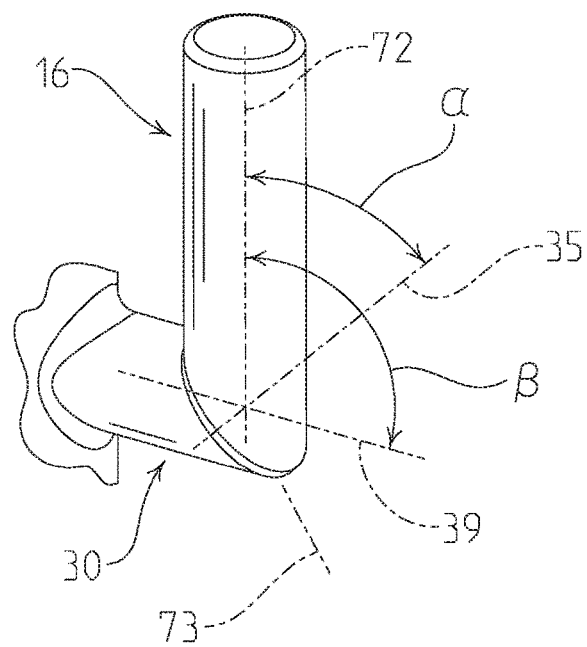
Figure 3B:
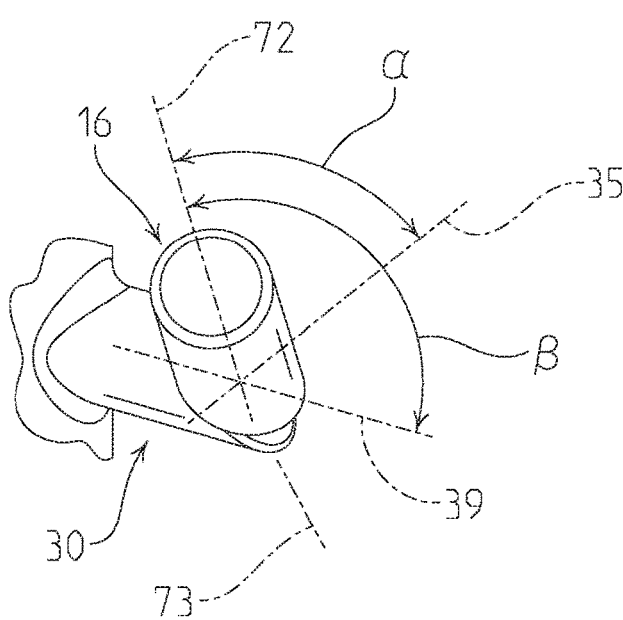
FIG. 3b is a detailed perspective view similar to FIG. 3a, with the handle in the second position of FIG. 1b.
Figure 3C:
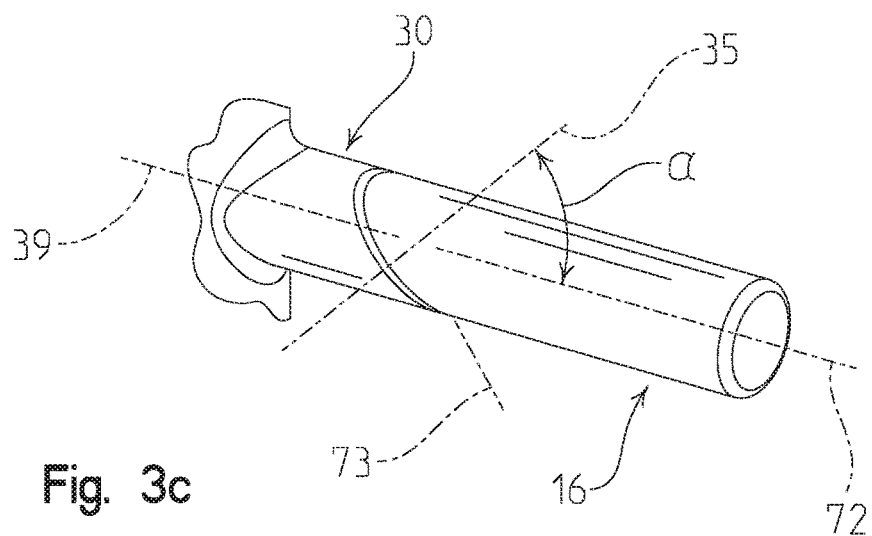
FIG. 3c is a detailed perspective view similar to FIG. 3b, with the handle in the third position of FIG. 1c.

FIGS. 3a-3c show additional details of the faucet 10 with handle 16 in the various angular positions or configurations of FIGS. 1a-1c, respectively. More particularly, FIGS. 1a and 3a illustrate the faucet 10 in an off mode or setting with the handle 16 in a first angular position or configuration. FIGS. 1b and 3b illustrate the faucet 10 in a mixed temperature mode or setting, with the handle 16 in a second or intermediate angular position or configuration. FIGS. 1c and 3c illustrate the faucet 10 in a full hot temperature mode or setting, with the handle 16 in a third or fully rotated angular position or configuration.

Figure 6:
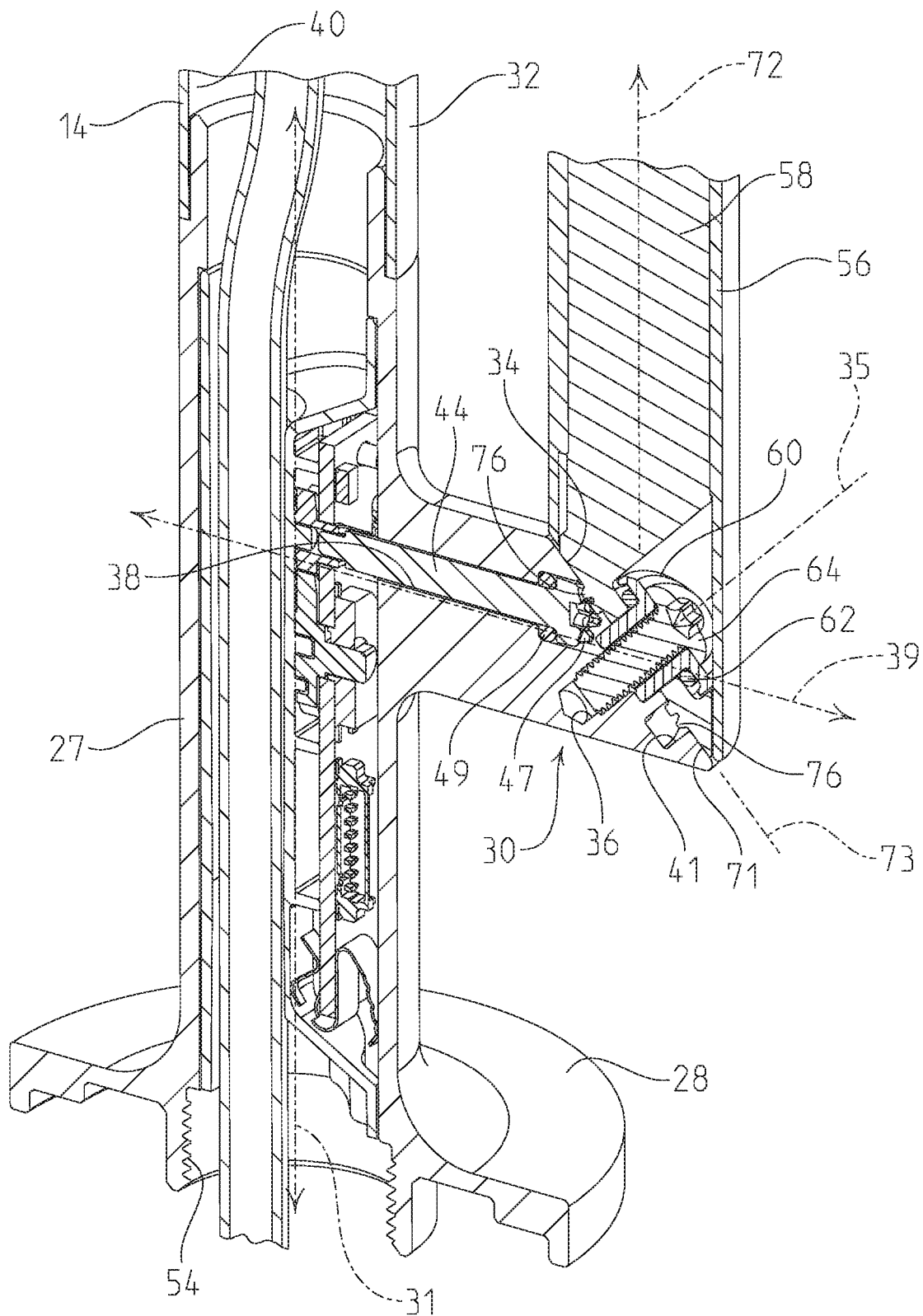
FIG. 6 is a cross-sectional perspective view of the faucet hub of FIG. 2, showing an illustrative temperature circuit assembly and handle interface.

Illustrative delivery spout 14 includes body or hub 27, base 28, water temperature indicator window 29, handle attachment base 30, and upper extension 32. Hub 27 is illustratively hollow and constructed from an electrically conductive metal or other electrically conductive material (e.g., a polymer including an electrically conductive filler). Hub 27 may telescope into upper extension 32 as shown in FIG. 6. Upper extension 32 forms a familiar curved faucet shape. Base 28 is sized, shaped, and located to engage mounting surface 11. However, in certain installations, such as those where mounting surface 11 is constructed from metal, base spacer 24 is employed to prevent direct contact of delivery spout 14 with mounting surface 11 for electrical isolation as further discussed herein. Base 28 defines a plane along its lower edge. When assembled to mounting surface 11, the base plane lies along the top of mounting surface 11.

Water temperature indicator window 29 is a translucent member constructed from glass, thermoplastic, or other material. Water temperature indicator window 29 is disposed in delivery spout 14 on a side thereof that is most often expected to be facing the user (in the same direction as the curve of upper extension 32).

Figure 7:
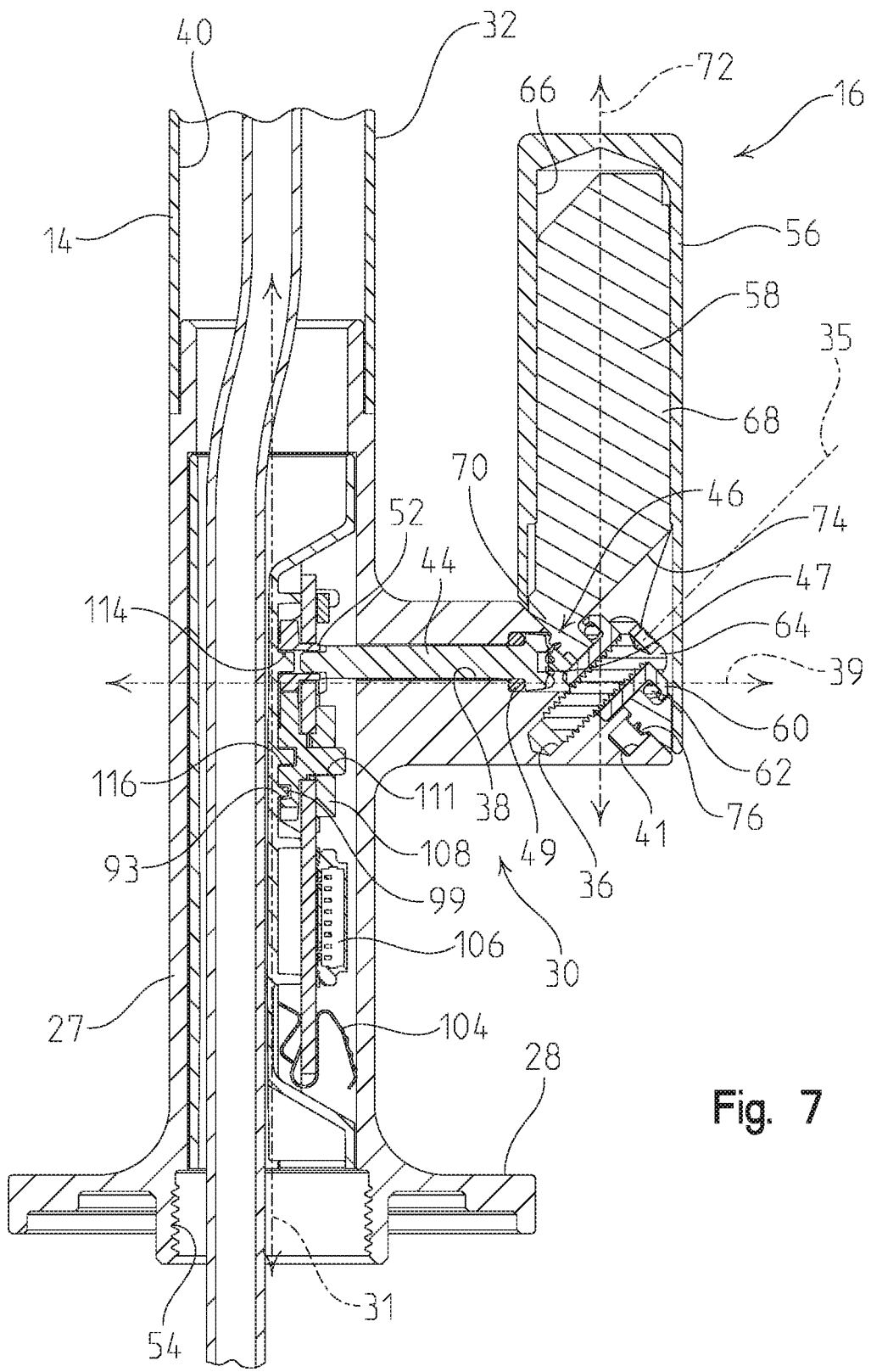
FIG. 7 is a cross-sectional view of the faucet hub of FIG. 6, showing the illustrative temperature circuit assembly and handle interface.

In the illustrative embodiment of FIGS. 1-8, handle attachment base 30 generally extends horizontally to the right (as viewed from the front) from hub 27. Handle attachment base 30 has a longitudinal base axis 39 that is illustratively perpendicular to a longitudinal axis 31 of the hub 27, from which handle attachment base 30 extends (FIGS. 6 and 7). The end of handle attachment base 30 farthest from hub 27 presents a handle interface surface 34, supporting handle 16 for rotation about rotational axis 35. Illustratively, rotational axis 35 extends perpendicularly to handle interface surface 34. Handle interface surface 34 faces upwardly from longitudinal base axis 39 at an angle, illustratively forty-five degrees, such that the lower side of the handle attachment base 30 extends farther away from hub 27 than the upper side of handle attachment base 30. Handle attachment base 30 includes an attachment bore 36 disposed therein. Attachment bore 36 is at least partially threaded and extends perpendicularly to handle interface surface 34 along rotational axis 35.

Figure 8:
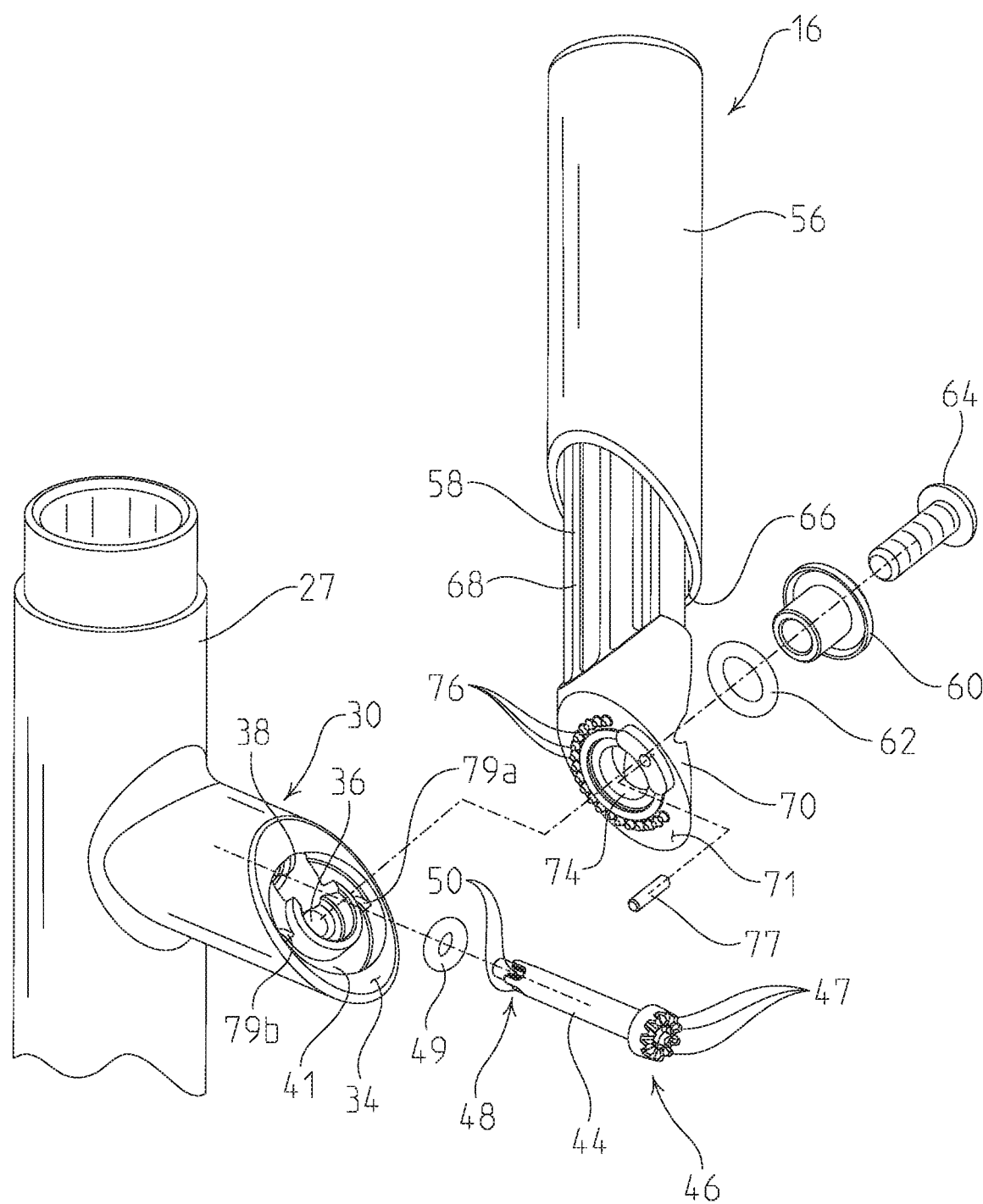
FIG. 8 is an exploded perspective view of the illustrative handle interface of FIG. 6.

With further reference to FIGS. 6-8, handle attachment base 30 further includes axle bore 38 defined therein that extends from handle interface surface 34 to within hub 27. Axle bore 38 illustratively extends parallel to the longitudinal axis 39 of handle attachment base 30 but is vertically offset therefrom. Handle attachment base 30 further includes teeth clearance bore 41 proximate the intersection of axle bore 38 and attachment bore 36. Clearance bore 41 extends in an arc (e.g., forming a semi-circle) about attachment bore 36 for providing space to allow teeth 76 of handle 16, discussed below, to be received therein.

Axle 44 extends within axle bore 38. Axle 44 includes a distal end 46 that includes a plurality of teeth 47 disposed radially thereon. A sealing o-ring 49 is illustratively supported at distal end 46 of axle 44. Axle 44 further includes proximal end 48 that presents interface surfaces, illustratively notches 50, designed and shaped to interface with and seat within gear hub 52 such that relative rotation of axle 44 to gear hub 52 is not permitted (i.e., rotatably couples axle 44 with gear hub 52) (FIGS. 5*a* and 5*b*).

Passage bore 40 extends throughout delivery spout 14, including hub 27, upper extension 32, and base 28. Passage bore 40 thereby provides a passageway that extends from the lower end of base 28 to an open or outlet end 42 of upper extension 32. At the lower end of base 28, passage bore 40 presents a threaded portion 54.

Figure 4:
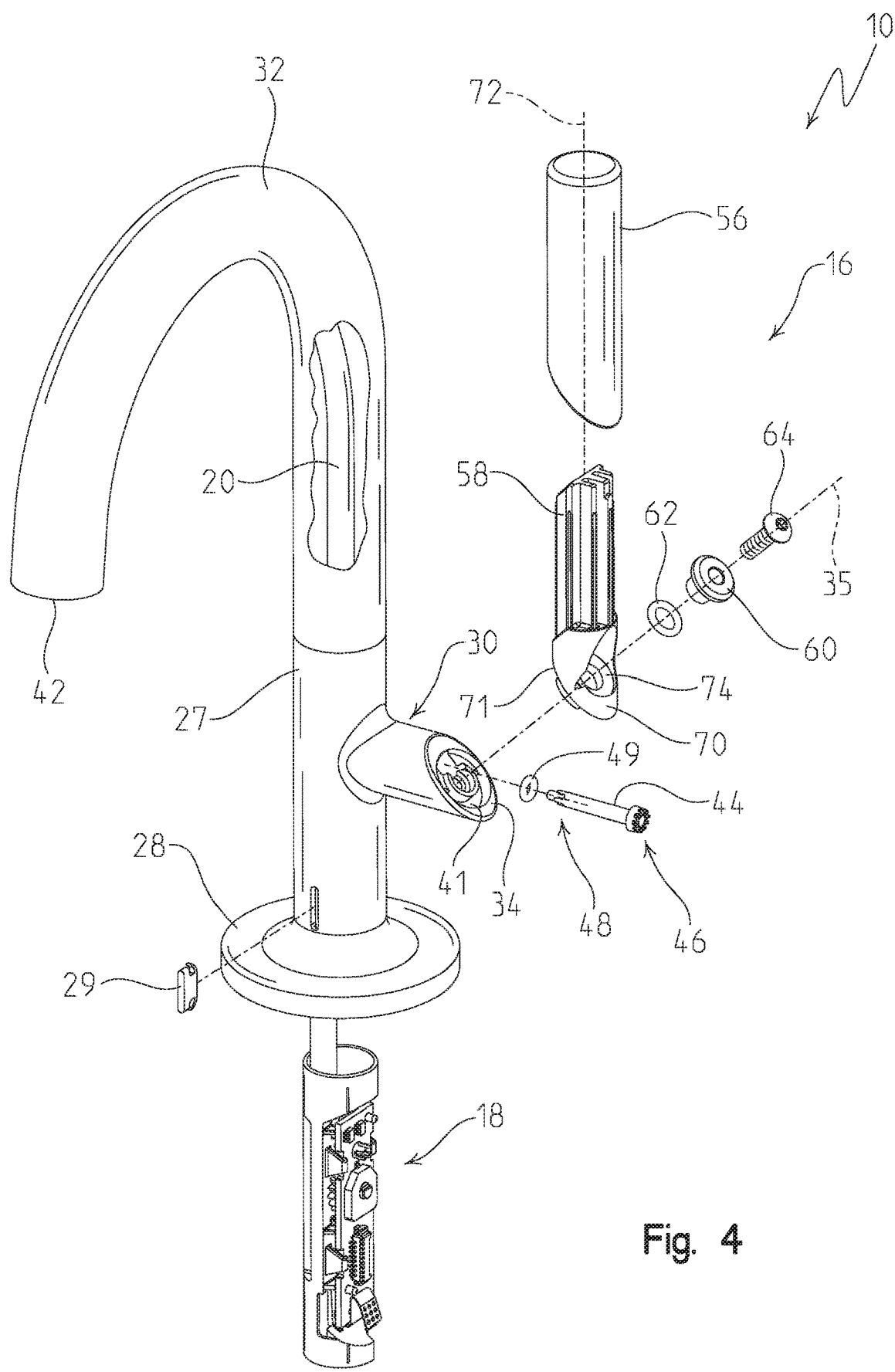
FIG. 4 is a partially exploded perspective view of the faucet of FIG. 1, with a partial cut-away of the delivery spout to show the water conduit extending therethrough.

With reference to FIGS. 4 and 8, handle 16 includes trim piece or cover 56, handle body 58, bushing 60, o-ring 62, and bolt 64. Trim piece 56 illustratively has an outer diameter substantially equal to the outer diameter of handle attachment base 30. Trim piece 56 is largely hollow and presents bore 66 therein sized to snuggly (e.g., through a friction fit) receive handle body 58 therein. Trim piece 56 is illustratively constructed from a conductive material, such as a metal. Handle body 58 is comprised of a main body 68 and an extension portion 70. Main body 68 is sized (length and diameter) to be received within bore 66. Extension portion 70 is disposed at a proximal end of handle body 58 and is designed to extend out of trim piece 56 to prevent direct contact of trim piece 56 and handle attachment base 30. Both trim piece 56 and handle body 58 present an angled base interface surface 71, illustratively at forty-five degrees, relative to a longitudinal axis 72 of handle 16. A selector movement plane 73 is defined intermediate the handle interface surface 34 and the base interface surface 71 and extends parallel thereto. Proximal end of extension portion 70 includes a plurality of teeth 76 disposed in an arc and sized, shaped, and located to interface with teeth 47 of axle 44.

Proximal end of main body 68 and extension portion 70 includes an attachment bore 74 therein. Attachment bore 74 is sized to receive bushing 60 and o-ring 62 therein. Bolt 64 is further received within an inner bore of bushing 60 as shown in FIGS. 6-8. Bolt 64 further extends into attachment bore 36 to threadably secure handle 16 to handle attachment base 30. Once so attached, teeth 76 are positioned to interface with teeth 47 of axle 44. Furthermore, once so attached, handle 16 is able to freely rotate about bushing 60 and against handle attachment base 30. Such rotation causes teeth 76 to induce rotation in axle 44. A stop pin 77 is illustratively coupled to extension portion 70 to rotate with handle 16 (FIG. 8). By engaging limit surfaces 79*a* and 79*b*, stop pin 77 limits rotational travel of handle 16 (e.g., to 180 degrees).

Water parameter control circuit assembly 18 illustratively comprises a temperature/flow circuit assembly and is further illustrated in FIGS. 5*a* and 5*b*. Water parameter control circuit assembly 18 illustratively includes a sleeve or support sheath 86, a circuit board 88, a first gear 90, and a second gear 92. Support sheath 86 is substantially cylindrical, having an outer diameter sized to fit within passage bore 40 of hub 27. Support sheath 86 also includes an inner passage 87 that permits tube 124 of water conduit 20 to pass therethrough. Support sheath 86 further includes a recessed side that provides a mounting surface for circuit board 88, first gear 90, and second gear 92. More specifically, support sheath 86 provides a first hub 96 upon which first gear 90 rotatably mounts, a second hub 98 upon which second gear 92 rotatably mounts, calibration hub 99, and circuit board clips 100 that retain circuit board 88 thereto. While circuit board 88 is illustratively mounted to support sheath 86 via clips 100, other conventional fasteners may be substituted therefor.

Circuit board 88 illustratively includes a light emitting diode (LED) 102, a clip 104, a pin interface 106, and a potentiometer 108. LED 102 may comprise a pair of LED's (e.g., a red LED and a blue LED), that are electrically coupled to circuit board 88 and configured to selectively emit red, blue, and various combinations of red and blue (purples, violets, etc.) to indicate the temperature of water being delivered by faucet 10. LED 102 is illustratively aligned behind water temperature indicator window 29. Clip 104 is illustratively conductive and spring biased. In the illustrative embodiment, clip 104 is doubled over to have a spring-like section that, when placed within passage bore 40, will engage the inner surface of hub 27 to provide electrical coupling therebetween.

Pin interface 106 is shown as an eight pin interface. One pin is electrically coupled to LED 102 to transmit power to the red LED 102. A second pin is electrically coupled to LED 102 to transmit power to the blue LED 102. A third pin is coupled to circuit board 88 to transmit an I$^2$C Clock signal. A fourth pin is coupled to circuit board 88 to transmit 3.3V power. A fifth pin provides ground to circuit board 88. A sixth pin is coupled to potentiometer 108 and transmits I$^2$C data thereon. A seventh pin provides a 1.8V dial reference voltage for potentiometer 108. An eighth pin is coupled to clip 104 and various other sensing circuitry, such as a capacitive sensor for transmitting an indication that a user has touched delivery spout 14. Pin interface 106 receives a header of a pin wire 110 (FIG. 2) coupled to electronic flow controller 84.

With reference to FIG. 5*b*, potentiometer 108 is electrically coupled to circuit board 88 and contains a rotatable keyway 111 centrally located therein. Keyway 111 is sized and shaped to receive a keyed post 112 of second gear 92. Rotation of keyed post 112 causes rotation of rotatable keyway 111 to alter the resistance presented by potentiometer 108 to circuit board 88.

First gear 90 is generally circular with gear hub 52 located centrally thereon and including radially outwardly extending teeth 113. Gear hub 52 defines a central bore 114 therethrough. As most easily seen in FIGS. 5*a* and 5*b*, gear hub 52 includes retaining fingers 115, illustratively presenting a sinusoidal surface, to interface with interface surfaces or notches 50 of axle 44. Accordingly, when proximal end of axle 44 is received in central bore 114, axle 44 and first gear 90 are rotatably coupled. Central bore 114 further receives first hub 96 such that first gear 90 is rotatably supported by support sheath 86. When mounted on first hub 96, and circuit board 88 is mounted on support sheath 86, first gear 90 is secured to water parameter control circuit assembly 18. Furthermore, when secured, gear hub 52 extends through a hole 117 in circuit board 88.

Similarly, second gear 92 is generally circular with keyed post 112 located centrally thereon and including radially outwardly extending teeth 119. Second gear 92 further includes a hub bore 116 defined therein to permit mounting of second gear 92 on second hub 98 (FIGS. 5 and 7). Mounting gears 90, 92 on hubs 96, 98 provide that the teeth 113, 119 of gears 90, 92 engage such that rotation of first gear 90 induces rotation in the second gear 92. Accordingly, rotation of axle 44 is translated to potentiometer 108 via gears 90, 92. Second gear 92 further includes calibration groove 93 defined therein (FIG. 7). Calibration groove 93 is positioned such that when second gear 92 is mounted on second hub 98, calibration hub 99 is received within calibration groove 93. Calibration groove 93 defines an arc within second gear 92, but illustratively does not define a closed circle. Ends of calibration groove 93 may define movement stop points or limits for second gear 92 that may be calibrated with potentiometer 108, as further detailed herein.

Referring further to FIG. 2, water conduit 20 includes aerator assembly 118, o-ring 120, distal fitting 122, tube 124, and proximal fitting 126. Aerator assembly 118 may comprise a conventional faucet aerator that threadably couples to the distal or outlet end 42 of upper extension 32. O-ring 120 is disposed between aerator assembly 118 and distal fitting 122 in assembly and prevents leaks at the connection therebetween. Tube 124 extends from distal fitting 122 through spout assembly 12, and water parameter control circuit assembly 18 to proximal fitting 126. Proximal fitting 126 is illustratively a quick connect fitting sized and shaped to be readily connected and disconnected from a quick connect receiver 130 of electronic flow controller 84.

Electronic flow controller 84 illustratively includes a housing 132, pin wire port 109, quick connect receiver 130, power connector 134, hot water inlet 136, cold water inlet 138, and at least one electrically operably valve 140. In certain illustrative embodiments, the valve 140 comprises a mixing valve or a cycling valve configured to receive and mix water flow from hot water and cold water inlets 136 and 138. In other illustrative embodiments, the valve 140 comprises a pair of proportional valves, one for controlling hot water flow from hot water inlet 136 and one for controlling cold water flow from cold water inlet 138. Pin wire 110 is illustratively coupled to electronics 139 within housing 132 by being received in pin wire port 109. Quick connect receiver 130 illustratively receives proximal fitting 126 and is secured thereto by retaining clip 141. Quick connect receiver 130 serves as a water outlet from electronic flow controller 84. Quick connect receiver 130 readily releases proximal fitting 126 upon release of retaining clip 140. Power connector 134 readily couples to power source via a nine-Volt battery type coupler. A temperature sensor 142, illustratively a thermistor, is configured to measure water temperature downstream of valve 140. More particularly, temperature sensor 142 is positioned within housing 132 in the passageway fluidly coupling valve 140 to receiver 130.

Figure 12:
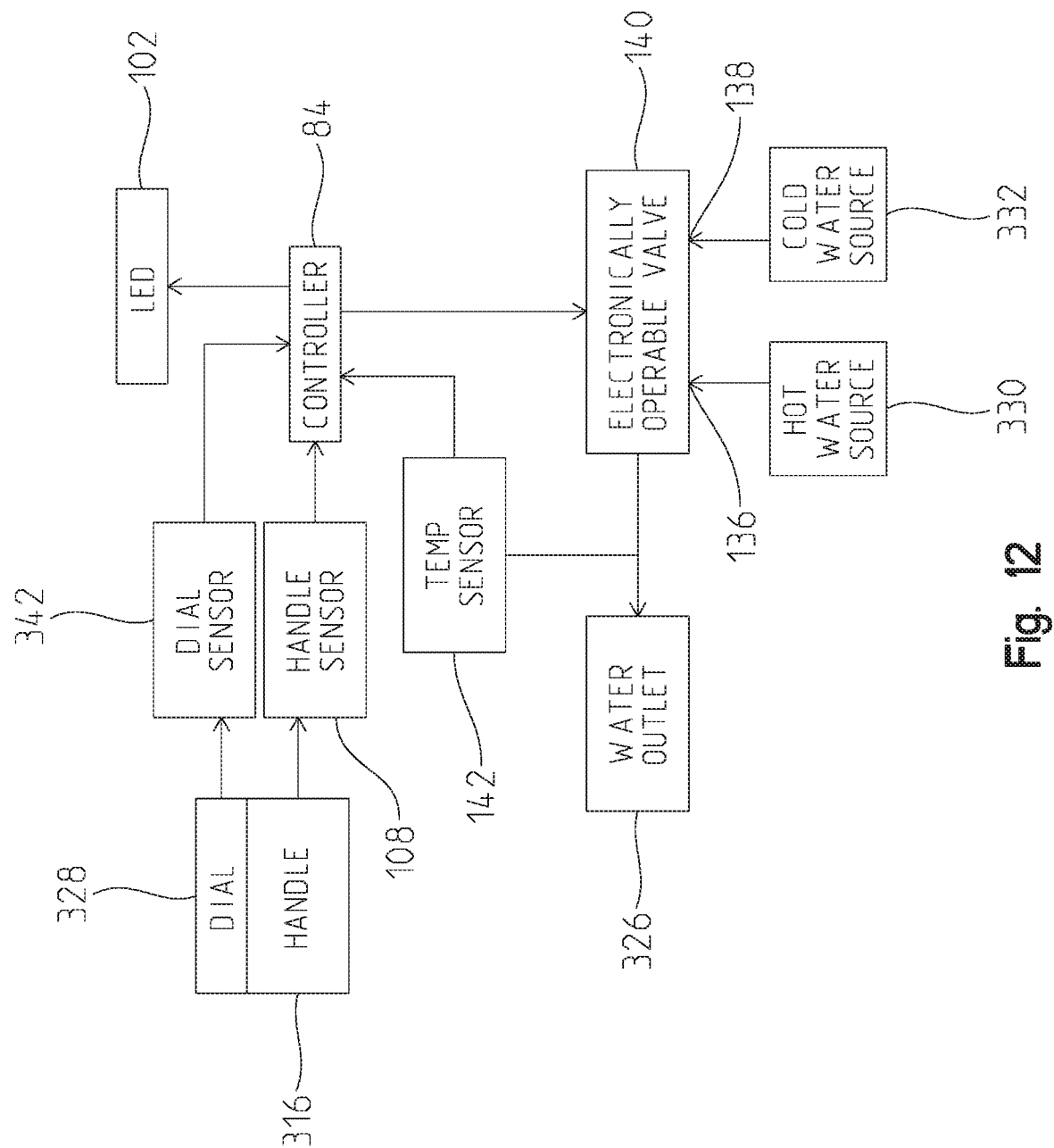

Water inlets 136, 138 couple to household hot and cold water supplies (330, 332 in FIG. 12). The valve 140 selectively opens and closes to allow water from inlets 136, 138 to flow to receiver 130. In the illustrative embodiment, valve 140 is a cycling valve including a disc (not shown) rotatable by an electric motor, wherein rotation in a counterclockwise direction causes the disc to initiate flow and then provide water exclusively from the cold water inlet 136, to a mix of water from the cold water and hot water inlets 136 and 138, to water exclusively from the hot water inlet 138 (i.e., off setting, to a cold water temperature setting, to a mixed water temperature setting, to a hot water temperature setting). Electronics 139 within housing 132 may include a processor for controlling operation of the valves 140 to dictate the flow and temperature of the water output at receiver 130 and ultimately at outlet 42 of delivery spout 14.

During assembly, aerator assembly 118, o-ring 120, and distal fitting 122 are coupled to tube 124 and placed in passage bore 40. Water conduit 20 is fed through inner passage 87 of water parameter control circuit assembly 18 and out of base 28. Proximal fitting 126 is then attached to tube 124.

Pin wire 110 is passed through nut 82, spacer 80, mounting bracket 78, gasket 26, (optionally base spacer 24 as discussed below), and shank 22 and then seated within pin interface 106 of circuit board 88. Support sheath 86 is then inserted into passage bore 40 of hub 27 such that gear hub 52 axially aligns with axle bore 38. Axle 44 is then inserted into axle bore 38 such that interface surfaces 50 of proximal end 48 engage gear hub 52. Indicator window 29 is also inserted into hub 27 to seat within support sheath 86. Shank 22 is then threadably engaged to threaded portion 54 of base 28 to further retain water parameter control circuit assembly 18 within passage bore 40.

Once axle 44 is inserted, it is rotated either to a full clockwise or full counterclockwise position. The full clockwise/counterclockwise position is determined when respective ends of calibration groove 93 of second gear 92 abut calibration hub 99. This full clockwise/counterclockwise position is then used to properly attach handle body 58 in either a full hot or off position, respectively. Accordingly, the hot/cold/off position of handle body 58 will properly correspond to the rotation of keyway 111. In other words, potentiometer 108 is properly calibrated to the rotational position of handle 16.

Handle body 58 attachment is achieved by aligning it such that attachment bore 74 aligns with attachment bore 36 and teeth 76 of extension portion 70 of handle body 58 engage teeth 47 of distal end 46 of axle 44. Bushing 60 is then located within attachment bore 74 and teeth clearance bore 41 and bolt 64 is placed within bushing 60 and threadably secured to attachment bore 36. Once handle body 58 is secured to handle attachment base 30, trim piece 56 is secured on handle body 58. As previously noted, handle body 58 is constructed from a non-conductive material. Accordingly, handle body 58 electrically isolates trim piece 56 from delivery spout 14. Thus, a user may touch handle 16 and not cause activation of valve 140 by the capacitance sensor (e.g., toggle the on/off setting of faucet 10).

Faucet 10 is then ready for mounting to mounting surface 11. If mounting surface 11 is a metal surface, base spacer 24 is mounted on shank 22. Base spacer 24 has a height that prevents base 28 from contacting mounting surface 11 when mounted. As noted, faucet 10 is a touch faucet. As discussed in more detail herein, a user's touch of delivery spout 14 causes activation and deactivation of flow in faucet 10 by controlling operation of valve 140. Without the use of base spacer 24 with a metal mounting surface 11, a user's touch of mounting surface 11 could unintentionally cause activation or deactivation of flow in faucet 10. Gasket 26 is located under base 28 (or under base spacer 24 if used) to seal delivery spout 14 to mounting surface 11.

Under mounting surface 11, mounting bracket 78 receives shank 22 and is positioned flush to the underside of mounting surface 11. Spacer 80 may also be placed on shank 22 and abutted to mounting bracket 78. Nut 82 is threadably engaged to shank 22 and is tightened to clamp delivery spout 14, shank 22, mounting bracket 78, and spacer 80 to secure delivery spout 14 on mounting surface 11.

Electronic flow controller 84 is illustratively mounted below mounting surface 11. As previously noted, pin wire 110 is mounted in pin interface 106. Proximal fitting 126 is secured in receiver 130. Hot and cold water supplies are coupled to hot water inlet 136 and cold water inlet 138, respectively. A power source, such as a battery pack (not shown) is attached to power connector 134.

In operation, a user pulls or rotates handle 16 out of the first or off position (vertical position as shown in FIGS. 1a and 3a) to start water flow from faucet 10. In the first position, the longitudinal handle axis 72 extends at angle α to rotational axis 35, and extends at angle β to longitudinal base axis 39. In the illustrative embodiment, angle α is 45 degrees and angle β is 90 degrees when handle is in the first position of FIGS. 1*a* and 3*a*. Once initiated, water flow in the illustrative faucet 10 may be arrested or stopped by returning handle 16 to the vertical position or by touching delivery spout 14. A user's touch of delivery spout 14, via the electrical connection provided by clip 104, alters the capacitance of a circuit (e.g., capacitive sensor) at least partially disposed on circuit board 88. This change in capacitance is communicated to electronic flow controller 84 via pin wire 110. Electronic flow controller 84 interprets this change in capacitance as a call to toggle the on/off setting of the flow condition of faucet 10. Electronic flow controller 84 then opens (or closes) valve 140 to toggle flow condition of faucet 10.

The user may adjust the position of handle 16 to indicate a desired water temperature. Positioning or rotating handle 16 just barely out of vertical, calls for water at the coldest setting. A user may pull or rotate handle 16 towards him/her to adjust the temperature setting, wherein increased rotation toward the horizontal position of FIGS. 1*c* and 3*c* increases the temperature setting. Pulling handle 16 causes rotation of handle 16 about bolt 64 and bushing 60. This rotation allows infinitely adjustable positioning of handle 16.

FIGS. 1*b* and 3*b* show a second or intermediate position of handle 16 defining a mixed or intermediate water temperature setting. More particularly, handle 16 has been rotated from the first position of FIG. 3*a* about rotational axis 35 by approximately 80 degrees. Potentiometer 108 detects the rotated position of handle 16 in the manner detailed herein, such that controller 84 causes valve 140 to provide mixed water flow from both hot water inlet 136 and cold water inlet 138 thereby providing an intermediate temperature to water provided to outlet end 42 of delivery spout 14. As illustrated in FIG. 3*b*, angle α between longitudinal handle axis 72 and rotational axis 35 is maintained at 45 degrees. However, angle β between longitudinal handle axis 72 and longitudinal base axis 39 varies as handle 16 is rotated. In FIG. 3*b*, angle β is substantially equal to 65 degrees. In other words, angle α stays substantially constant, while angle β varies as handle 16 is rotated about rotational axis 35.

FIGS. 1*c* and 3*c* show handle 16 in a third or hot temperature position (horizontal position as shown in FIGS. 1*c* and 3*c*) that calls for water at the hottest setting. More particularly, handle 16 has been rotated from the second position of FIG. 3*b* about rotational axis 35 by approximately 100 degrees. In other words, handle 16 has been rotated from the first position of FIG. 3*a* about rotational axis 35 by approximately 180 degrees. Potentiometer 108 detects the rotated position of handle 16 in the manner detailed herein, such that controller 84 causes valve 140 to provide mixed water flow from only hot water inlet 136 thereby providing a hot temperature to water provided to outlet end 42 of delivery spout 14. As illustrated in FIG. 3*c*, angle α between longitudinal handle axis 72 and rotational axis 35 is maintained at 45 degrees. However, angle β between longitudinal handle axis 72 and longitudinal base axis 39 varies as handle 16 is rotated. In FIG. 3*c*, angle β is substantially equal to 0 degrees, since the longitudinal handle axis 72 is coaxially aligned with the longitudinal base axis 39. As noted above, angle α stays substantially constant, while angle β varies as handle 16 is rotated about rotational axis 35 from the first position of FIG. 3*a*, through the second position of FIG. 3*b*, to the third position of FIG. 3*c*.

The rotation of handle 16 and the rotation of attached teeth 76 induces rotation of axle 44 via teeth 47. Rotation of axle 44 causes rotation of first gear 90 which causes rotation of second gear 92. Rotation of second gear 92 causes rotation of rotatable keyway 111. Rotation of rotatable keyway 111 alters the resistance of potentiometer 108 as seen by circuit board 88. The resistance of potentiometer 108 seen by circuit board 88 is communicated to electronic flow controller 84 via pin wire 110. Electronic flow controller 84 then adjusts valve 140 that gate hot water inlet 136 and cold water inlet 138 to adjust the temperature of the water output at receiver 130 and therefore outlet end 42 of delivery spout 14. Temperature sensor 142 provides feedback to circuit board 88 of water temperature at the outlet of valve 140.

More particularly, temperature sensor 142 is also present within electronic flow controller 84. The temperature sensor 142 detects the temperature of the water delivered to receiver 130. The temperature sensor 142 also outputs an electrical signal indicative of the sensed temperature. Electronic flow controller 84 interprets this electrical signal and outputs another electrical signal on pin wire 110. This signal on pin wire 110 operates to control the color of light emitted by led 102. Light emitted by LED 102 shines through water temperature indicator window 29 to be viewable by the user. LED 102 provides a blue light to indicate relatively cold water. LED 102 provides a red light to indicate relatively hot water. LED 102 provides mixtures of red and blue light (purple, violet, etc.) to indicate the spectrum between hot and cold.

Accordingly, the position of handle 16 is viewable by the user to provide a visual indication of the approximate temperature being requested. LED 102 is viewable by the user to provide a visual indication of the approximate temperature being realized at aerator assembly 118 at outlet end 42 of delivery spout 14.

Figure 9A:
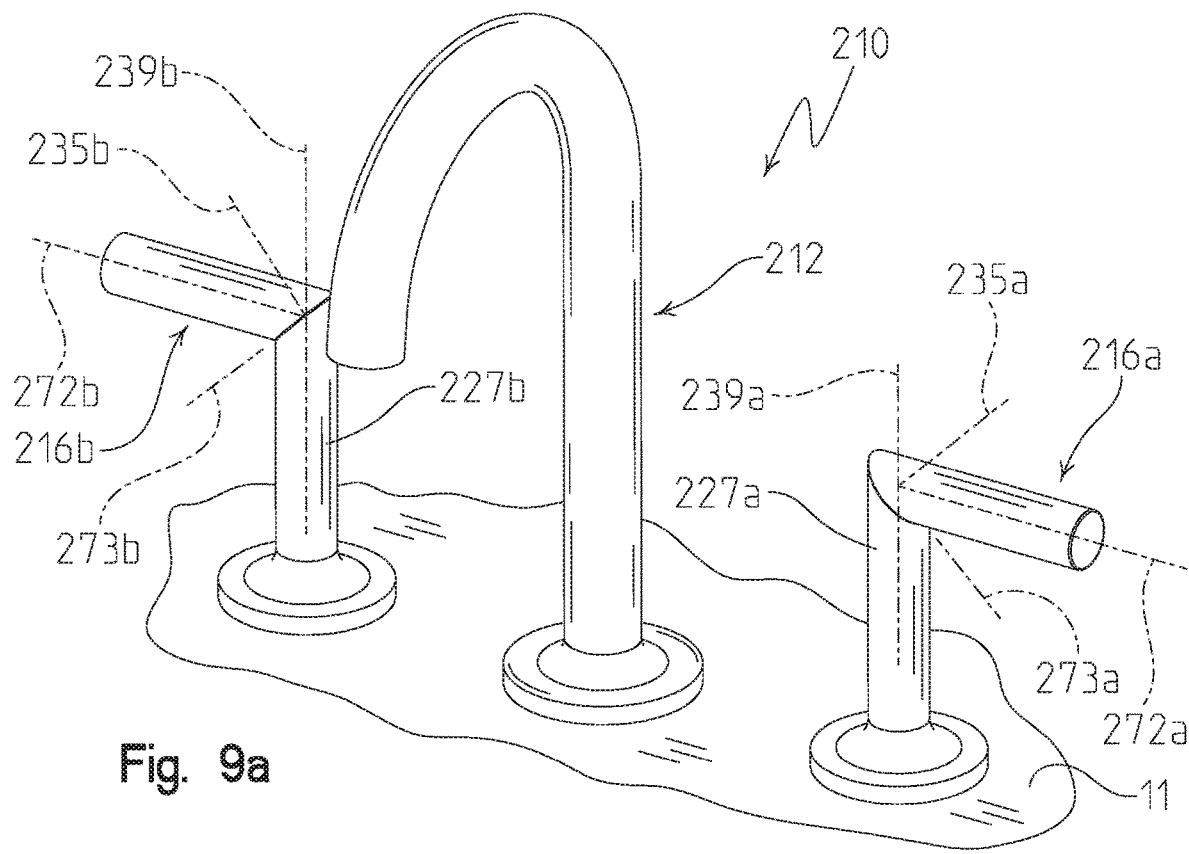
FIG. 9a is a perspective view of an illustrative faucet of the present disclosure including a pair of control handles, showing each of the control handles in a first or off position.
Figure 9B:
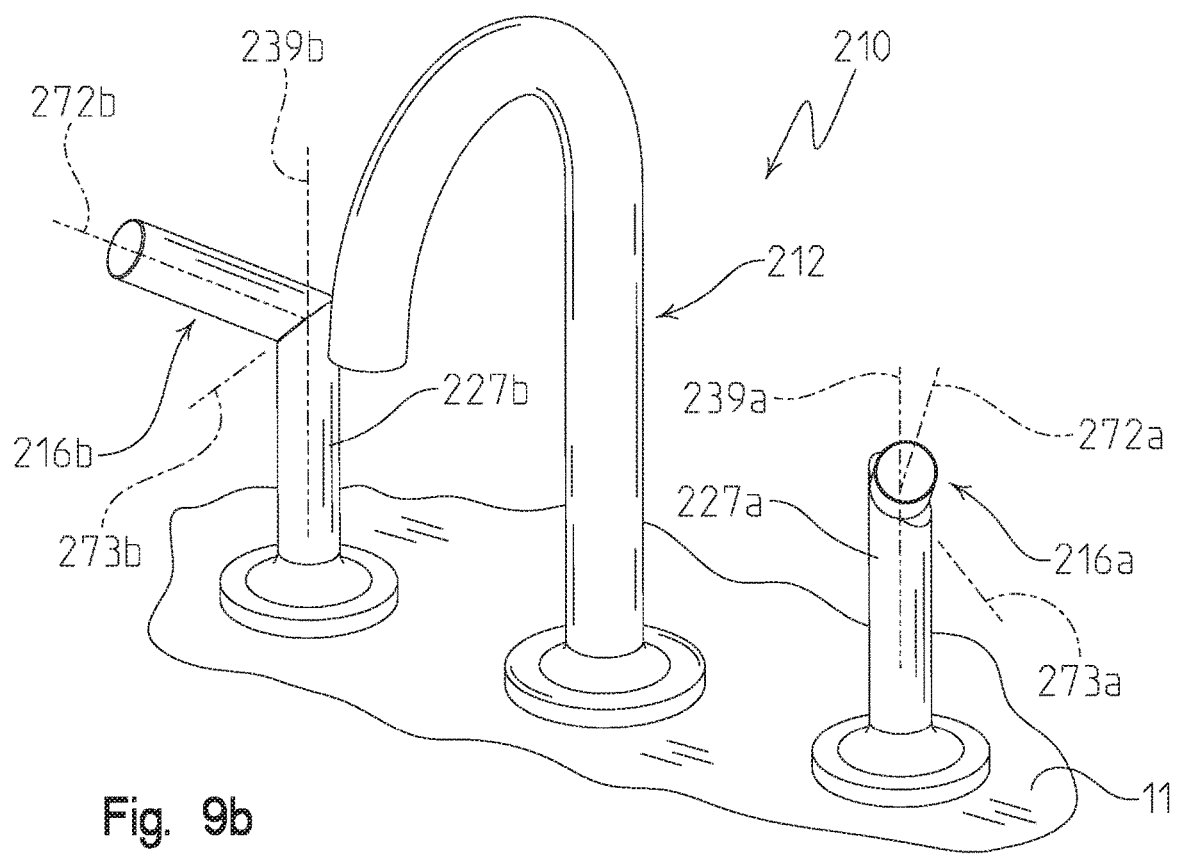
FIG. 9b is a perspective view similar to FIG. 9a, showing each of the control handles in a second or intermediate flow position.
Figure 9C:
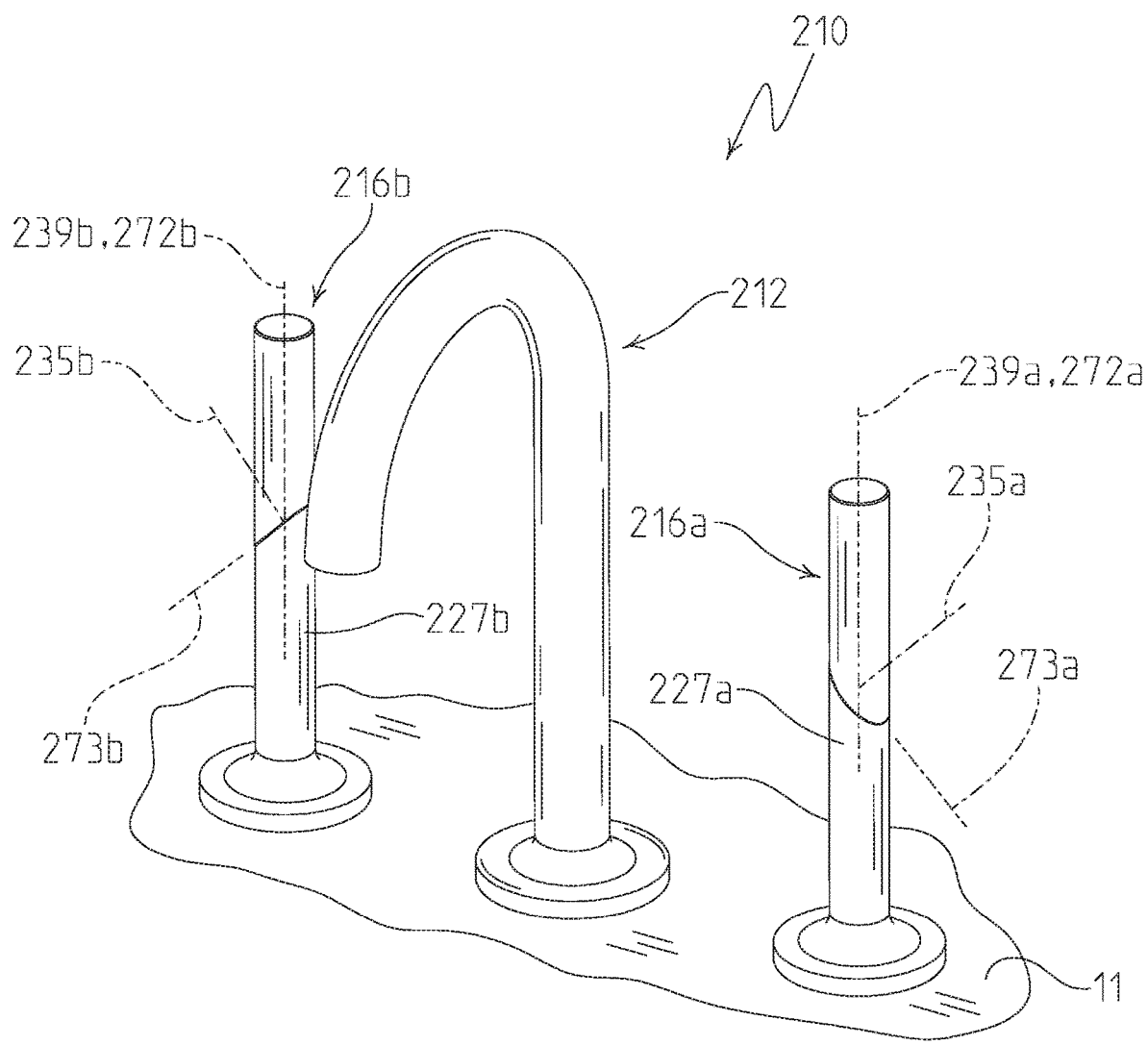
FIG. 9c is a perspective view similar to FIG. 9b, showing each of the control handles in a third or full flow position.

FIGS. 9*a*-9*c* show another illustrative embodiment faucet 210 including a delivery spout 212 extending between a pair of handles 216*a*, 216*b*. The two handle faucet 210 includes handle 216*a* which controls cold water flow to delivery spout 212 (illustratively through cold water inlet 138) and a hot water handle 216*b* which controls hot water flow to delivery spout 212 (illustratively through hot water inlet 136). Spout 212 and handles 216*a*, 216*b* are supported by mounting surface 11, illustratively a sink deck.

Handles 216*a*, 216*b* are each supported by a respective attachment base 227*a*, 227*b* along an angled interface plane 273*a*, 273*b*. In the illustrative embodiment, the interface planes 273*a*, 273*b* are angled approximately 45 degrees from horizontal. Each attachment base 227*a*, 227*b* extends vertically along a respective longitudinal base axis 239*a*, 239*b*, while each handle 216*a*, 216*b* extends along a respective longitudinal handle axis 272*a*, 272*b*. The handles 216*a*, 216*b* are each rotatable about a respective rotational axis 235*a*, 235*b* extending perpendicular to the associated interface plane 273*a*, 273*b*. More particularly, each handle 216*a*, 216*b* may be supported for rotational movement relative to respective attachment base 227*a*, 227*b* in a manner similar to the manner in which handle 16 is operably coupled to attachment base 30, as detailed above in connection with faucet 10. Additionally, handles 216*a*, 216*b* may each be configured to operably couple to water parameter control circuit assembly 18 similar to that detailed above. However, in the illustrative faucet 210, the water parameter control circuit assembly 18 is configured to communicate with electronic flow controller 84 to control flow rate through hot water inlet 136 in response to rotation of handle 216*b*, and to control flow rate through cold water inlet 138 in response to rotation of handle 216a through hot water inlet 136.

FIG. 9a illustrates both handles 216a, 216b in their respective first or off positions, illustratively with each longitudinal handle axis 272a, 272b extending perpendicular to the longitudinal base axis 239a, 239b in a horizontal direction. In the off position, the water parameter control circuit assembly 18 associated with each handle 216a, 216b sends a signal of handle position to the flow controller 84 which instructs respective electrically operable flow control valves 140 to block water flow through water inlets 136 and 138.

FIG. 9b illustrates both handles 216a, 216b in second or intermediate flow positions, wherein each handle 216a, 216b has been rotated by approximately 80 degrees about respective rotational axis 235a, 235b toward the user from the off position of FIG. 9a. In the intermediate flow position of FIG. 9b, the water parameter control circuit assembly 18 associated with each handle 216a, 216b sends a signal of handle position to the flow controller 84 which instructs respective electrically operable flow control valves 140 to permit restricted water flow through hot and cold water inlets 136 and 138 at an intermediate flow rate.

FIG. 9c illustrates both handles 216a, 216b in third or full flow positions, wherein each handle 216a, 216b has been rotated by approximately 100 degrees about respective rotational axis 235a, 235b toward the user from the second position of FIG. 9b. In the third position of FIG. 9c, each longitudinal handle axis 272a, 272b extends in a vertical direction and is coaxially aligned with respective longitudinal base axis 239a, 239b. The water parameter control circuit assembly 18 associated with each handle 216a, 216b sends a signal of handle position to the flow controller 84 which instructs respective electrically operable flow control valves 140 to permit full water flow through hot and cold water inlets 136 and 138.

With reference now to FIGS. 10a-13, a further illustrative faucet 310 is shown. The faucet 310 includes many similar components as the faucet 10 detailed above. As such, similar components will be identified with like references numbers.

Illustrative faucet 310 includes spout assembly 312 having a faucet body or delivery spout 314, and a selector or control handle 316. Illustrative delivery spout 314 includes body or hub 27, mounting base 28, water temperature indicator window 29, handle attachment base 30, and upper extension 32. The mounting base 28 illustratively couples the hub 27 to mounting surface 11.

Figure 10A:
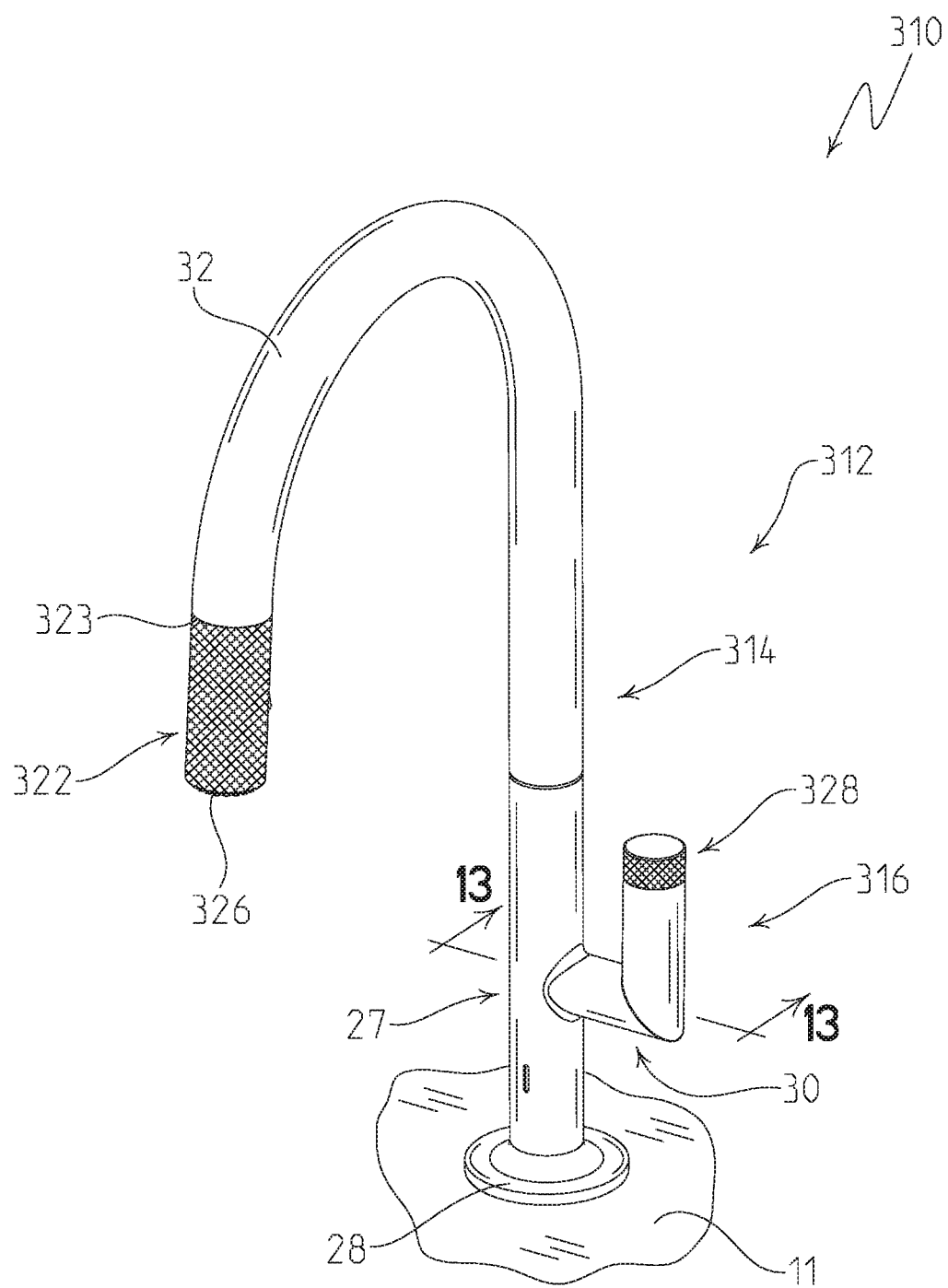
FIG. 10a is a perspective view of an illustrative faucet of the present disclosure including a control handle supporting a rotatable dial, showing pull-out sprayhead coupled to a delivery spout.
Figure 10B:
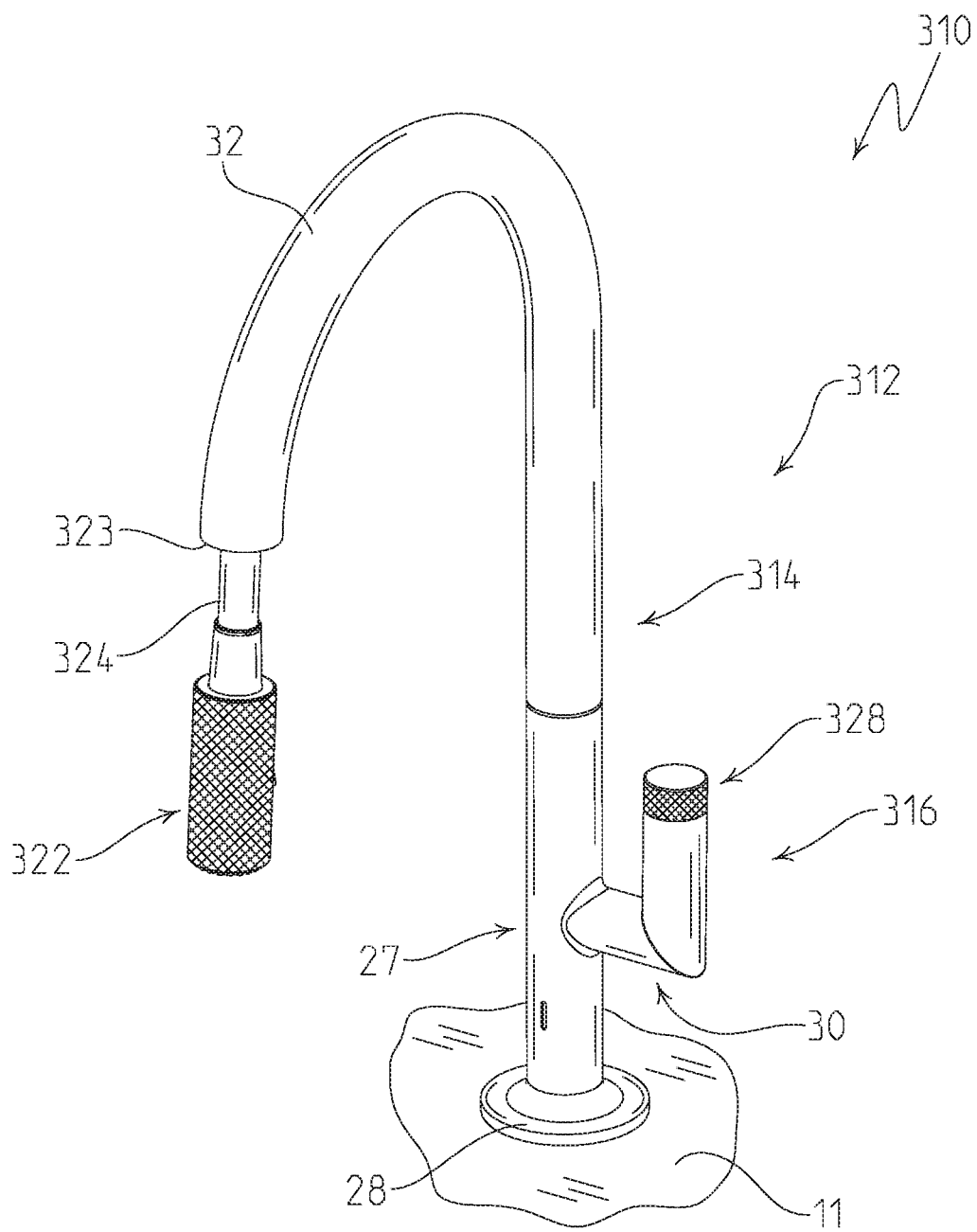
FIG. 10b is a perspective view of the illustrative faucet of FIG. 10a, showing the pull-out sprayhead uncoupled from the delivery spout.

Illustratively, a pullout sprayhead 322 is removably coupled to a distal end 323 of the delivery spout 314. The sprayhead 322 illustratively includes a water outlet 326 fluidly coupled to a flexible tube 324 slidably received within the delivery spout 314. More particularly, FIG. 10a shows the sprayhead 322 coupled to the distal end 323 of the delivery spout 314, and FIG. 10b shows the sprayhead 322 uncoupled from, and in spaced relation to, the distal end 323 of the delivery spout 314. The flexible tube 324 is fluidly coupled to an outlet of the electrically operable valve 140. As detailed above, water inlets 136, 138 of the electrically operable valve 140 couple to household hot and cold water supplies 330, 332 (FIG. 12).

Control handle 316 is essentially the same as control handle 16 detailed above, with the exception of additional selector or control dial 328. More particularly, the control handle 316 is supported for movement in the manner detailed above with respect to handle 16 in connection with FIGS. 3a-3c.

Figure 13:
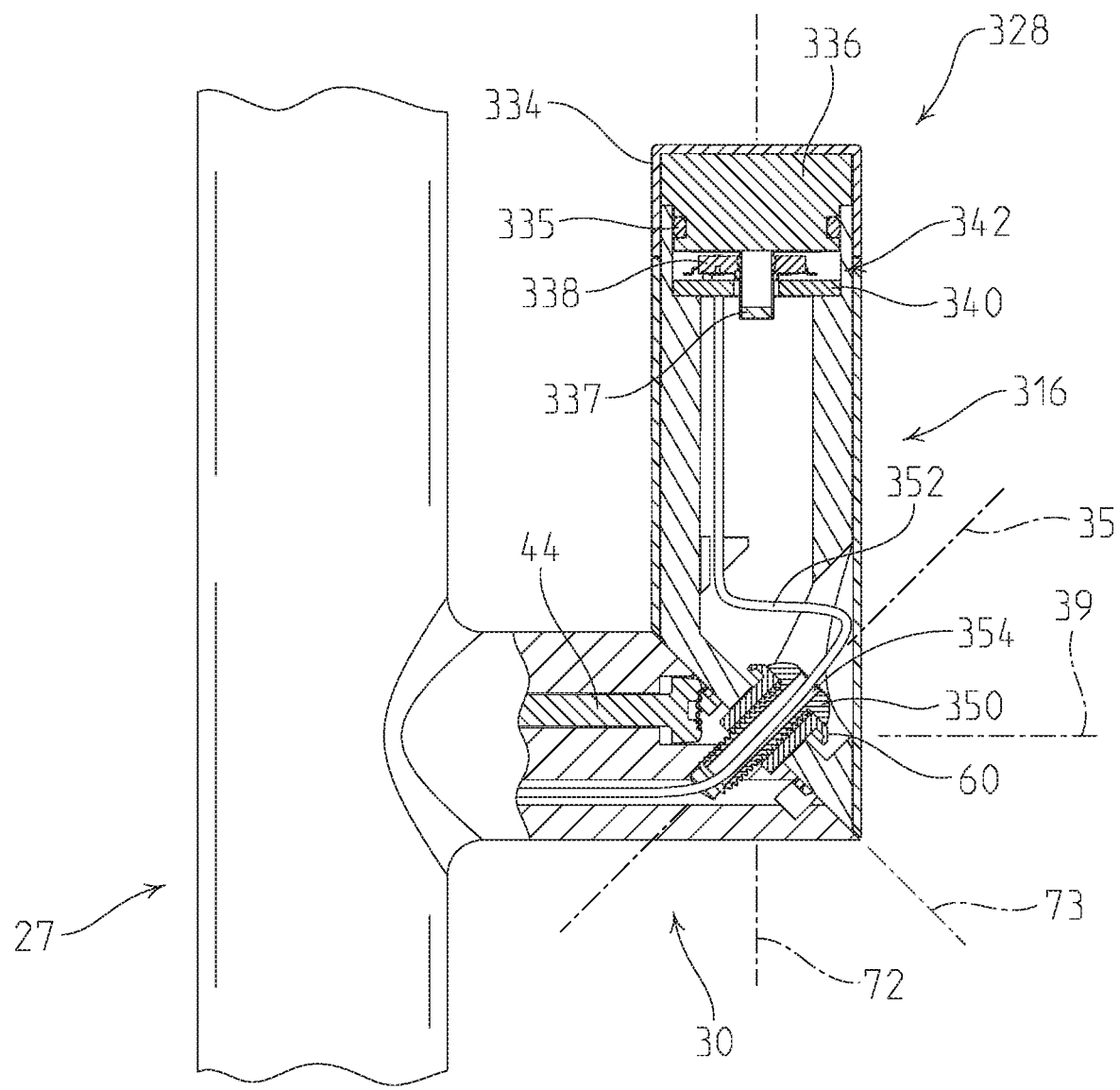
Figure 14:
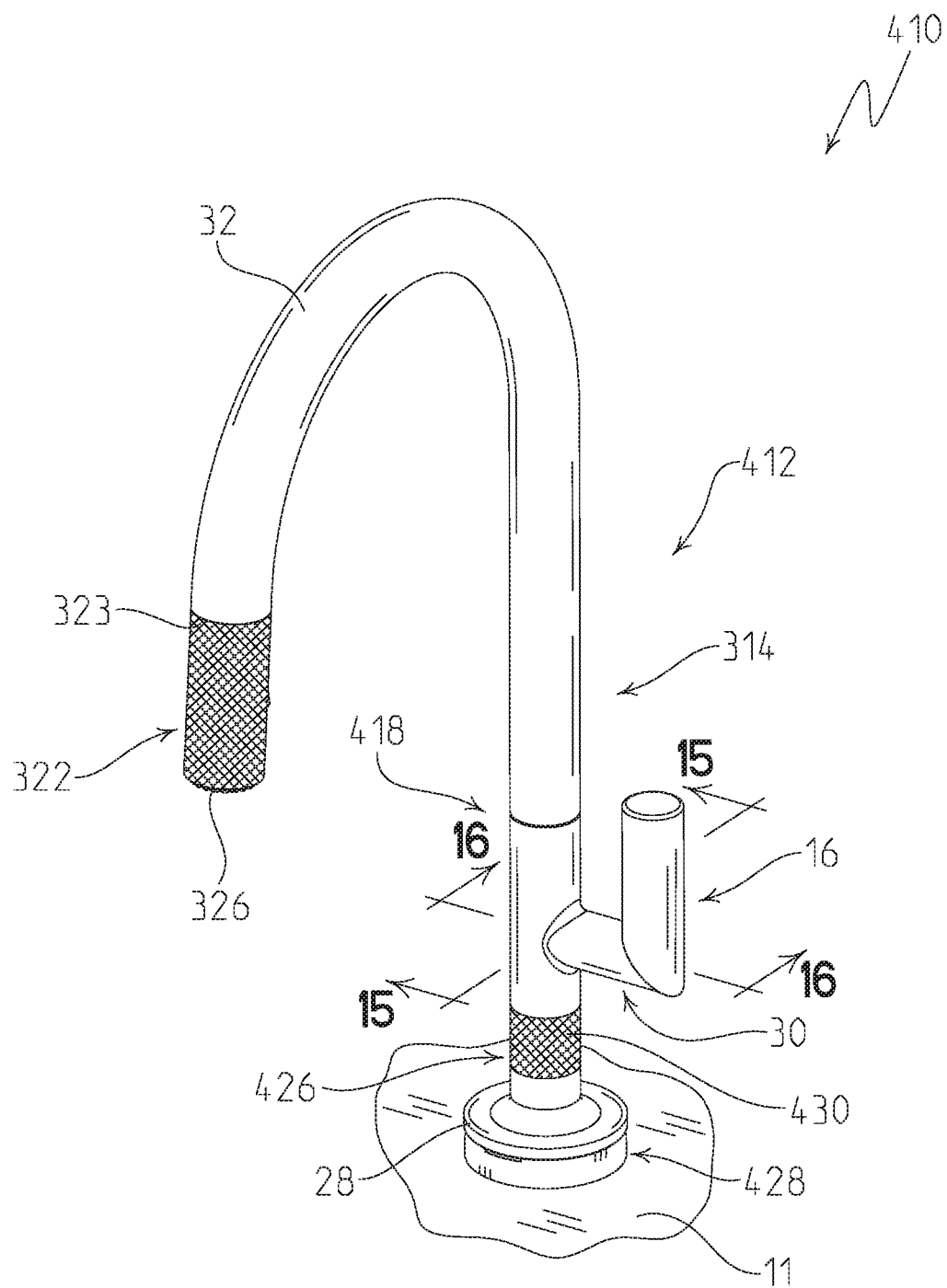
FIG. 14 is a perspective view of an illustrative faucet of the present disclosure including a control handle, and a hub supporting a rotatable dial.
Figure 15:
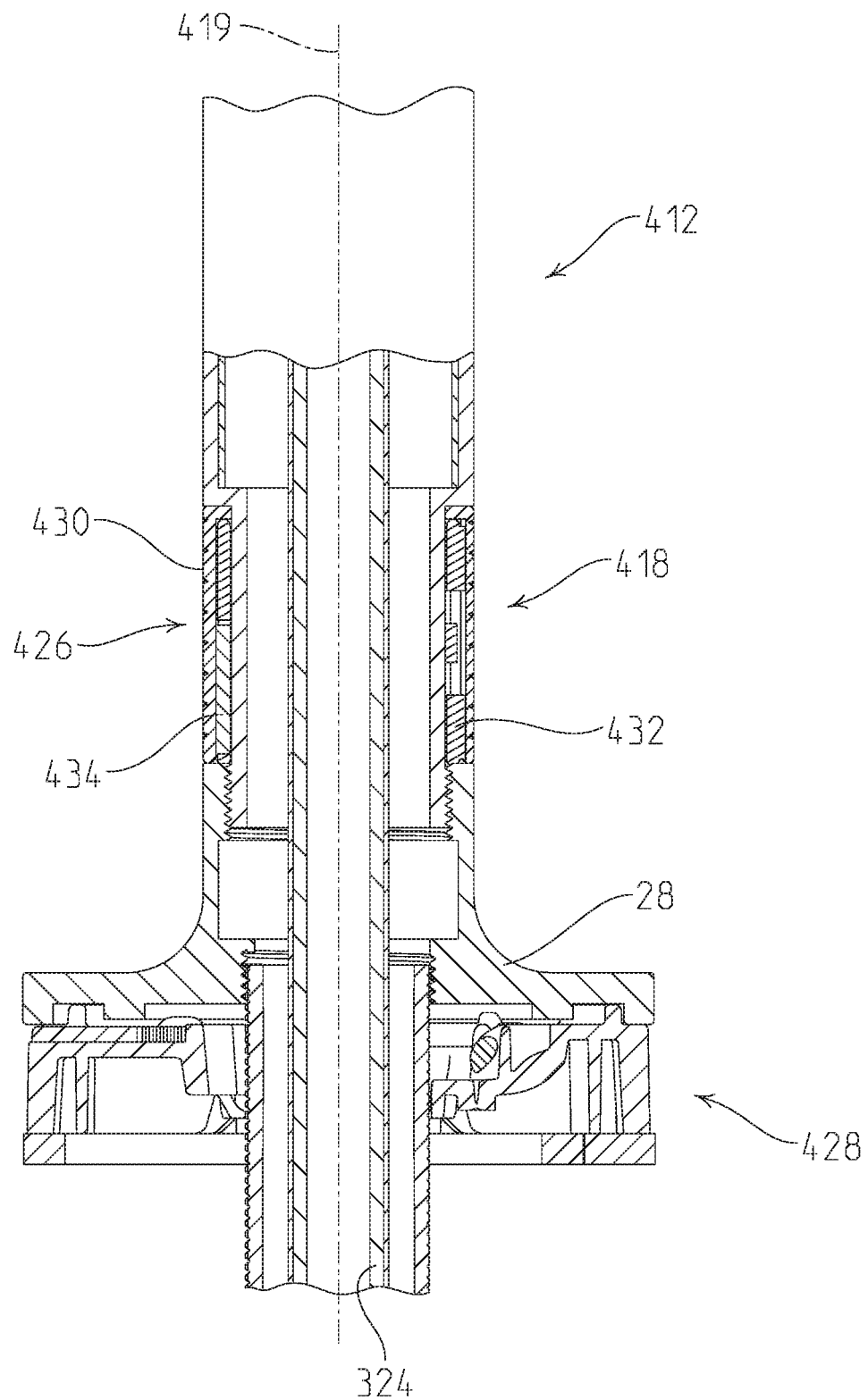
FIG. 15 is a partial cross-sectional view taken along line 15-15 of FIG. 14.
Figure 16:
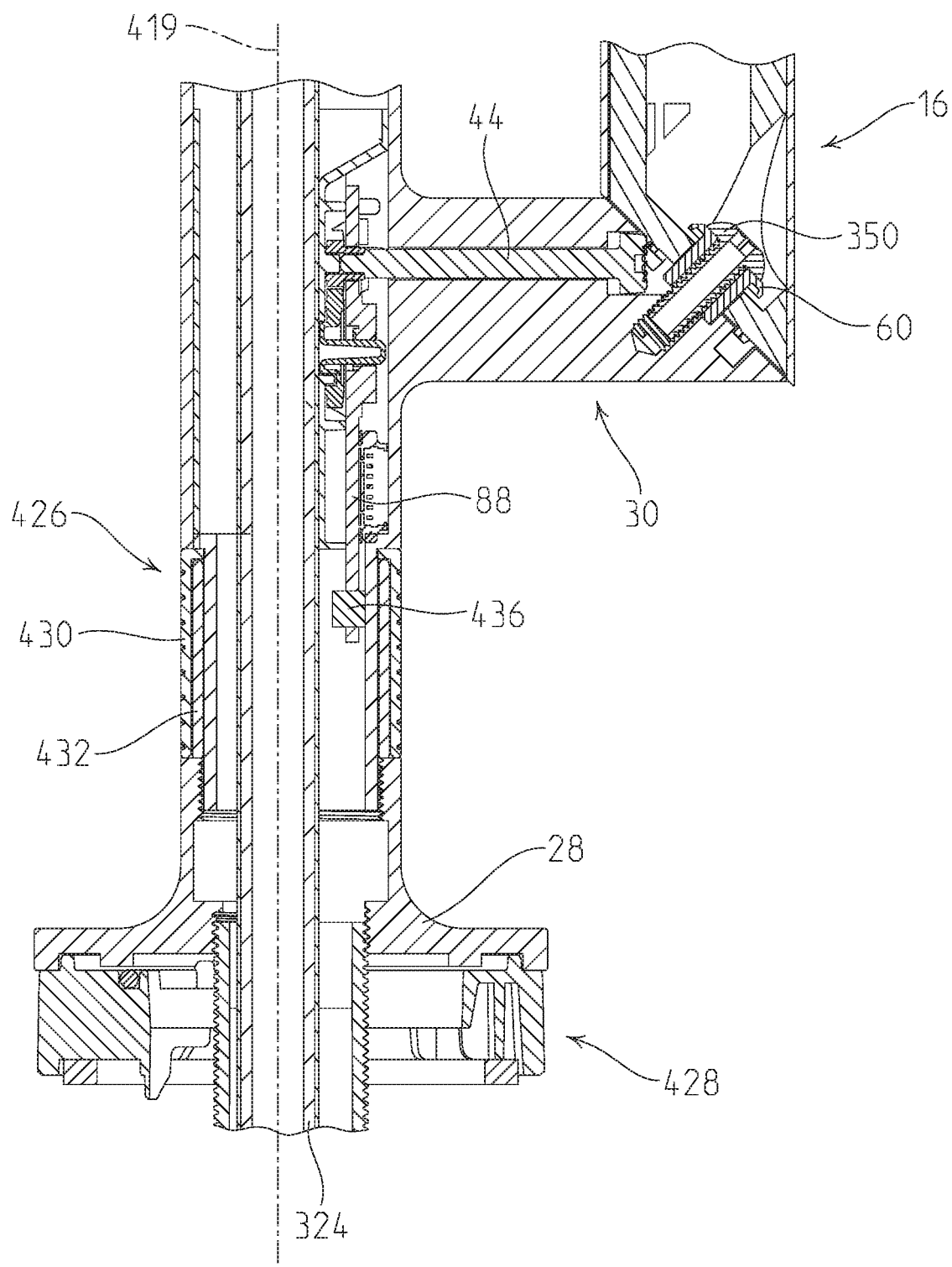
FIG. 16 is a partial cross-sectional view taken along line 16-16 of FIG. 14.
Figure 17:
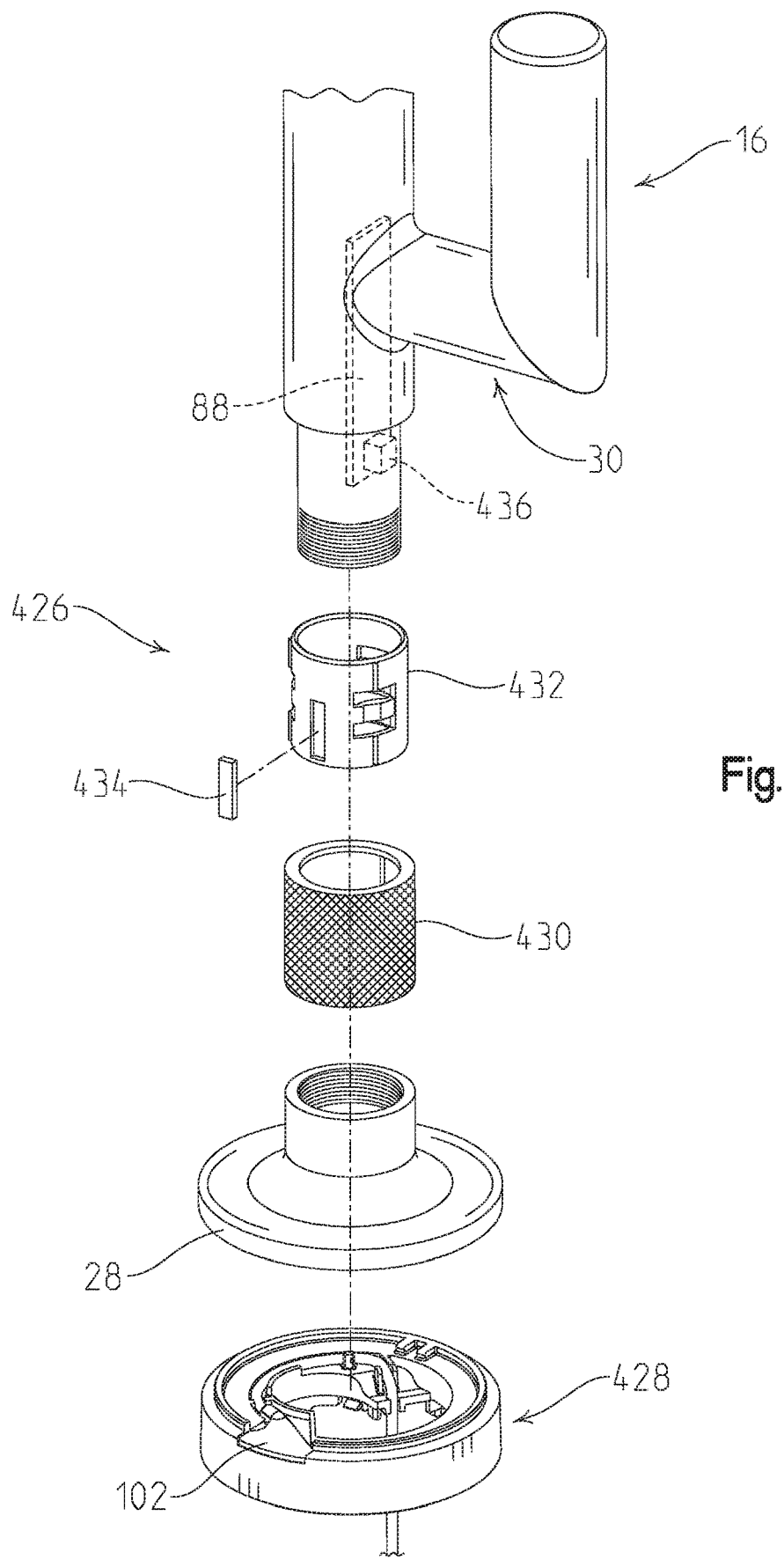
FIG. 17 is an exploded perspective view of the rotatable dial of the hub of FIG. 14.

With reference to FIGS. 12 and 13, a first position or handle sensor, illustratively potentiometer 108, is operably coupled to the handle 316. More particularly, the potentiometer 108 detects the rotational position of the handle 316 about rotational axis 35 and provides a signal indicative thereof to electronic flow controller 84. The electronic flow controller 84 is in electrical communication with the electrically operable valve 140, wherein rotation of the handle 316 as detected by the potentiometer 108 controls a first water parameter (e.g., water flow rate) via operation of the electrically operable valve 140 by the controller 84.

Figure 11:
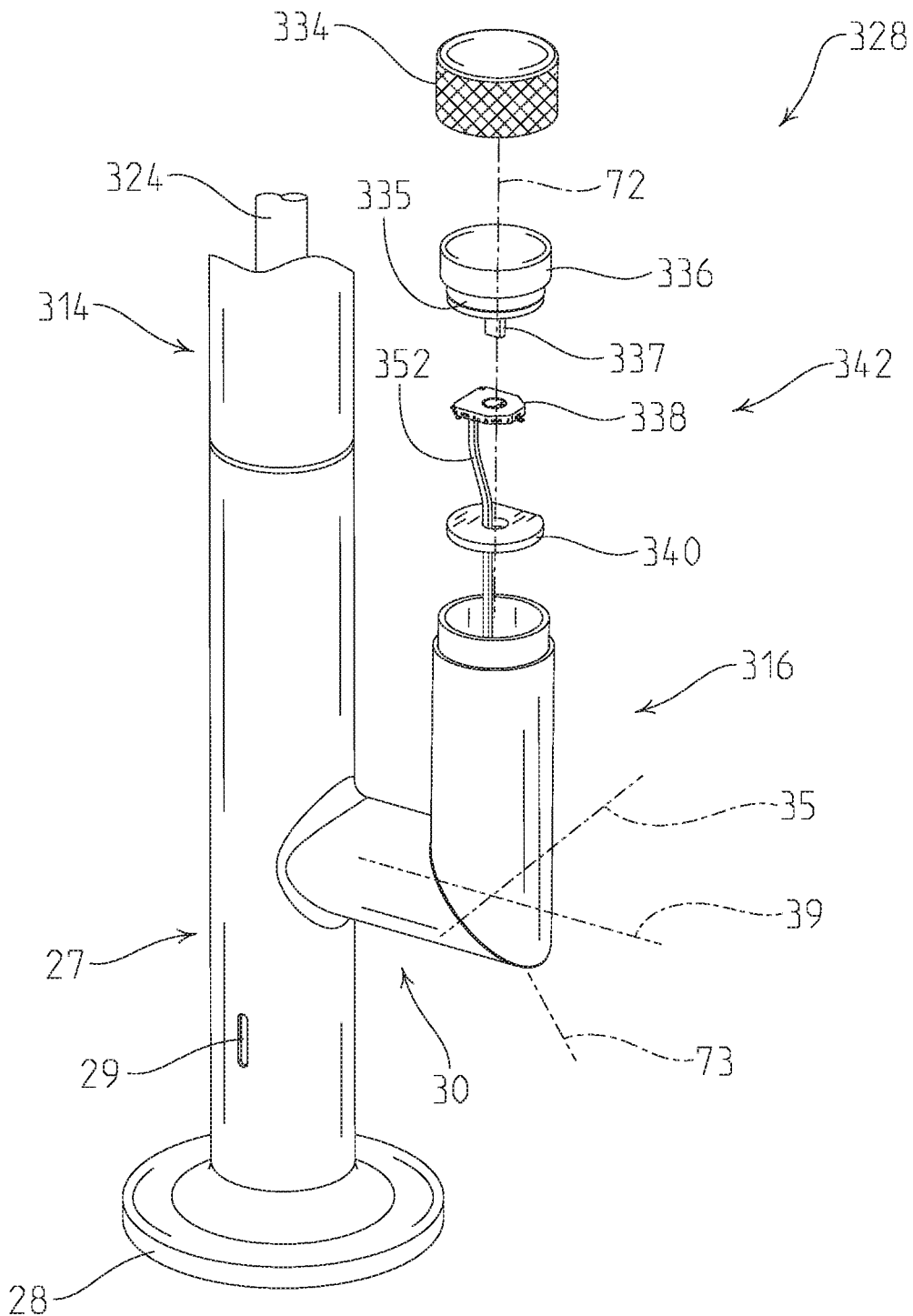

With further reference to FIGS. 11-13, the control dial 328 is supported for rotation about the longitudinal axis 72 of the handle 316 for controlling a second water parameter (e.g., water temperature). The control dial 328 illustratively includes an outer cover 334 coupled to an inner core 336. The outer cover 334 and the inner core 336 are supported for rotation about the longitudinal axis 72. The inner core 336 includes a retainer 335 (e.g., an o-ring) to assist in retaining the outer cover 334 on the inner core 336. The inner core 336 illustratively includes a downwardly extending arm or tab 337 operably coupled to a potentiometer 338 supported on circuit board 340, thereby defining a second position or dial sensor 342. As may appreciated, rotation of the control dial 328 is transmitted to the potentiometer 338 via the tab 337. The potentiometer 338 is illustratively in communication with the controller 84 via wires 352. The wires 352 are configured to extend through an inner bore 354 of a bushing or threaded sleeve 350 to circuit board 88 supported within the hub 318.

As detailed above, rotation of the control handle 316 about the rotational axis 35 controls the first water parameter, while rotation of the control dial 328 about the longitudinal axis 72 controls the second water parameter. In the illustrative embodiment, the first water parameter comprises water flow rate of water discharged from the water outlet 326, and the second water parameter comprises water temperature of water discharged from the water outlet 326. It should be appreciated that alternative embodiments the first water parameter may comprise water temperature, while the second water parameter may comprise water flow rate.

The control handle 316 in a first rotational position defines a first setting of the flow rate, while the control handle 316 in a second rotational position defines a second setting of the flow rate. Similarly, rotation of the control dial 328 to a first position defines a first setting of the water temperature, and rotation of the control dial 328 to a second position defines a second setting of the water temperature.

With reference now to FIGS. 14-17, a further illustrative faucet 410 is shown. The faucet 410 includes many similar components as the faucet 310 detailed above. As such, similar components will be identified with like references numbers.

Illustrative faucet 410 includes spout assembly 412 having faucet body or delivery spout 314, and selector or control handle 16. The illustrative control handle 416 is further detailed above. Illustrative delivery spout 314 includes a body or hub 418, mounting base 28, handle attachment base 30, and upper extension 32. The mounting base 28 illustratively couples the hub 318 to mounting surface 11. The base 28 is illustratively supported above an illumination insulator spacer 428 including a light, such as LED 102.

The hub 418 of the faucet 410 illustratively supports a control dial 426 for rotation about the longitudinal axis 419 of the hub 418. The control dial 426 illustratively includes an inner ring 432 coupled to an outer dial 430. The inner ring 432 supports a magnet 434 configured to be detected by a second position or dial sensor 436, such as a Hall-effect sensor. The sensor 436 is illustratively supported on circuit board 88 supported within the hub 418.

As may appreciated, rotation of the control dial 426 and corresponding magnet 434 is detected by the sensor 436. The sensor 436 is illustratively in communication with the controller 84.

As detailed above, rotation of the control handle 16 about the rotational axis 35 controls the first water parameter, while rotation of the control dial 426 about the longitudinal axis 419 controls the second water parameter. In the illustrative embodiment, the first water parameter comprises water flow rate of water discharged from the water outlet 326, and the second water parameter comprises water temperature of water discharged from the water outlet 326. It should be appreciated that alternative embodiments the first water parameter may comprise water temperature, while the second water parameter may comprise water flow rate.

The control handle 16 in a first rotational position defines a first setting of the flow rate, while the control handle 16 in a second rotational position defines a second setting of the flow rate. Similarly, rotation of the control dial 426 to a first position defines a first setting of the water temperature, and rotation of the control dial 426 to a second position defines a second setting of the water temperature.

Although the disclosure has been described in detail with reference to certain preferred embodiments, variations and modifications exist within the spirit and scope of the disclosure as described and defined in the following claims.

The invention claimed is:

1. A faucet comprising:
a handle attachment base; and
a handle defining a longitudinal handle axis, coupled to the handle attachment base and supported for rotation about a rotational axis to control a first water parameter;
a dial supported for rotation about the longitudinal handle axis relative to the handle to control a second water parameter;
the longitudinal handle axis extending at an acute angle relative to the rotational axis;
a first position sensor operably coupled to the handle to detect the position of the handle relative to the handle attachment base;
a controller electrically coupled to the first position sensor;
an electrically operable valve operably coupled to the controller and configured to control the first water parameter of water flowing through an outlet in response to the position of the handle detected by the first position sensor;
a second position sensor operably coupled to the dial to detect the position of the dial relative to the handle;
the controller electrically coupled to the second position sensor; and
the electrically operable valve configured to control the second water parameter of water flowing through the outlet in response to the position of the dial detected by the second position sensor.

2. The faucet of claim 1, wherein:
the handle attachment base has a longitudinal base axis; and
the rotational axis is angularly offset from the longitudinal base axis and the longitudinal handle axis, such that the angular position of the longitudinal handle axis relative to the longitudinal base axis varies as the handle is rotated about the rotational axis.

3. The faucet of claim 2, wherein:
the handle attachment base defines a handle movement plane angularly offset from the longitudinal base axis; and
the rotational axis extends perpendicular to the handle movement plane.

4. The faucet of claim 3, wherein the longitudinal handle axis is oriented at a first angle relative to the rotational axis, and the longitudinal handle axis is oriented at a second angle relative to the longitudinal base axis, the first angle being substantially constant and the second angle varying as the handle is rotated about the rotational axis.

5. The faucet of claim 3, wherein in a first angular position of the handle the longitudinal handle axis extends in a vertical direction, and in a second angular position of the handle the longitudinal handle axis extends substantially perpendicular to the first angular position in a horizontal direction.

6. The faucet of claim 1, wherein the first water parameter is one of water flow rate and water temperature, and the second water parameter is one of the other of the water temperature and the water flow rate.

7. The faucet of claim 1, further including a spout assembly of which the handle attachment base is a part, the spout assembly further including a hub defining a vertical axis and a liquid pathway within the hub.

8. The faucet of claim 7, further comprising a pull-out sprayhead removably coupled to the spout assembly.

9. The faucet of claim 1, wherein the dial is operably coupled to an end of the handle.

10. The faucet of claim 1, further comprising a temperature sensor configured to detect the temperature of water delivered to an outlet, and a light configured to provide an indication of the temperature of water detected by the temperature sensor.

11. A faucet comprising:
a spout assembly including:
a hub defining a vertical axis,
a liquid pathway extending within the hub,
a handle attachment base extending perpendicular to the hub and defining a horizontal axis, the handle attachment base including an end having a first mounting surface;
a control handle defining a longitudinal handle axis coupled to the handle attachment base for rotation about a rotational axis from a first position defining a first setting of a first water parameter and a second position defining a second setting of the first water parameter, the control handle including an end having a second mounting surface;
a control dial coupled to the control handle for rotation about the longitudinal handle axis from a first position defining a first setting of a second water parameter and a second position defining a second setting of the second water parameter;
the longitudinal handle axis extending at an acute angle relative to the rotational axis;
a first position sensor operably coupled to the control handle to detect the position of the control handle relative to the handle attachment base;
a controller electrically coupled to the first position sensor;
an electrically operable valve operably coupled to the controller and configured to control the first water parameter of water flowing through an outlet in response to the position of the control handle detected by the first position sensor;

a second position sensor operably coupled to the control dial to detect the position of the control dial relative to the control handle;

the controller electrically coupled to the second position sensor; and the electrically operable valve configured to control the second water parameter of water flowing through the outlet in response to the position of the dial detected by the second position sensor.

12. The faucet of claim 11, wherein the first mounting surface and the second mounting surface define a handle movement plane angularly oriented intermediate the vertical axis of the hub of the spout assembly and the horizontal axis of the handle attachment base of the spout assembly.

13. The faucet of claim 11, wherein an outer surface of the spout assembly is electrically conductive such that a user's touch of the spout assembly is electrically communicated to circuitry coupled to the spout assembly.

14. The faucet of claim 11, wherein rotation of the control handle causes altering of the setting of a first potentiometer, and rotation of the control dial causes altering of the setting of a second potentiometer.

15. The faucet of claim 11, wherein the first water parameter is one of water flow rate and water temperature, and the second water parameter is one of the other of the water temperature and the water flow rate.

16. The faucet of claim 11, further comprising a pull-out sprayhead removably coupled to the spout assembly.

17. The faucet of claim 11, wherein the control dial is operably coupled to an end of the control handle.

* * * * *